(12) United States Patent
Nishikata et al.

(10) Patent No.: US 8,521,467 B2
(45) Date of Patent: Aug. 27, 2013

(54) METHOD FOR ACCELERATION ESTIMATION, ACCELERATION ESTIMATING APPARATUS, AND MOBILE TERMINAL

(75) Inventors: Naomi Nishikata, Tokyo (JP); Hirohisa Kusuda, Tokyo (JP)

(73) Assignee: Vodafone Group PLC, Berkshire (GB)

( * ) Notice: Subject to any disclaimer, the term of this patent is extended or adjusted under 35 U.S.C. 154(b) by 609 days.

(21) Appl. No.: 11/706,239

(22) Filed: Feb. 15, 2007

(65) Prior Publication Data

US 2007/0146323 A1    Jun. 28, 2007

Related U.S. Application Data

(63) Continuation of application No. PCT/JP2005/016112, filed on Sep. 2, 2005.

(30) Foreign Application Priority Data

Sep. 7, 2004    (JP) ................................. 2004-259613

(51) Int. Cl.
  *G01P 15/00*    (2006.01)
(52) U.S. Cl.
  USPC ............. 702/141; 702/95; 702/150; 702/151; 702/152; 701/4; 701/38
(58) Field of Classification Search
  USPC .................. 702/95, 141, 150–152; 701/4, 38
  See application file for complete search history.

(56) References Cited

U.S. PATENT DOCUMENTS 5,225,637 A * 7/1993 Rodgers et al. ............ 178/19.03
5,452,698 A * 9/1995 Denz et al. ................ 123/406.24

(Continued)

FOREIGN PATENT DOCUMENTS

EP    1104143 A2    5/2001
EP    1788397 A1    5/2007

(Continued)

OTHER PUBLICATIONS

Earth Page, "average rate of change," http://earthmath.kennesaw.edu/main_site/review_topics/rate_of_change.htm (2004).*

(Continued)

*Primary Examiner* — Jonathan C Teixeira Moffat
*Assistant Examiner* — Hyun Park
(74) *Attorney, Agent, or Firm* — Kratz, Quintos & Hanson, LLP

(57) ABSTRACT

Acceleration and attitude angles are measured by sensors mounted on a moving object and the measurement results are collected. The measurement results of acceleration are separated into low-frequency acceleration components and high-frequency acceleration components, and a time-rate-of-changes of attitude angles are calculated based on the measurement results of the attitude angles. After finishing extraction of the high-frequency acceleration components and the low-frequency acceleration components, and finishing calculation of the time-rate-of-changes of attitude angles, the rotation contributing acceleration and translation contributing acceleration are estimated based on the high-frequency acceleration components, the low-frequency acceleration components, the attitude angles and the time-rate-of-change of attitude angles. As a result, a translation contributing acceleration which contributes to a translational movement of a moving object, and a rotation contributing acceleration which contributes to a rotational movement of the moving object are estimated with improved accuracy.

20 Claims, 20 Drawing Sheets

(56) References Cited

U.S. PATENT DOCUMENTS

| | | | |
|---|---|---|---|
| 5,598,187 A | 1/1997 | Ide et al. | |
| 5,981,884 A | 11/1999 | Sato et al. | |
| 6,360,602 B1* | 3/2002 | Tazartes et al. | 73/514.18 |
| 6,653,964 B2* | 11/2003 | Mizuno et al. | 341/155 |
| 2002/0059027 A1 | 5/2002 | An et al. | |
| 2002/0183958 A1* | 12/2002 | McCall et al. | 702/141 |
| 2003/0039325 A1* | 2/2003 | Watanabe | 375/346 |
| 2005/0212760 A1* | 9/2005 | Marvit et al. | 345/156 |

FOREIGN PATENT DOCUMENTS

| | | |
|---|---|---|
| JP | 65-5185 | 1/1987 |
| JP | 62-70766 | 4/1987 |
| JP | 05-072223 | 3/1993 |
| JP | 7-28591 | 1/1995 |
| JP | 9-43269 | 2/1997 |
| JP | 10-21000 | 1/1998 |
| JP | 10-224509 | 8/1998 |
| JP | 2002-169645 | 6/2002 |
| JP | 2002-171316 | 6/2002 |
| JP | 2004-102738 | 4/2004 |

OTHER PUBLICATIONS

Supplementary European Search Report dated Sep. 27, 2011, for counterpart application No. EP05781378.

* cited by examiner

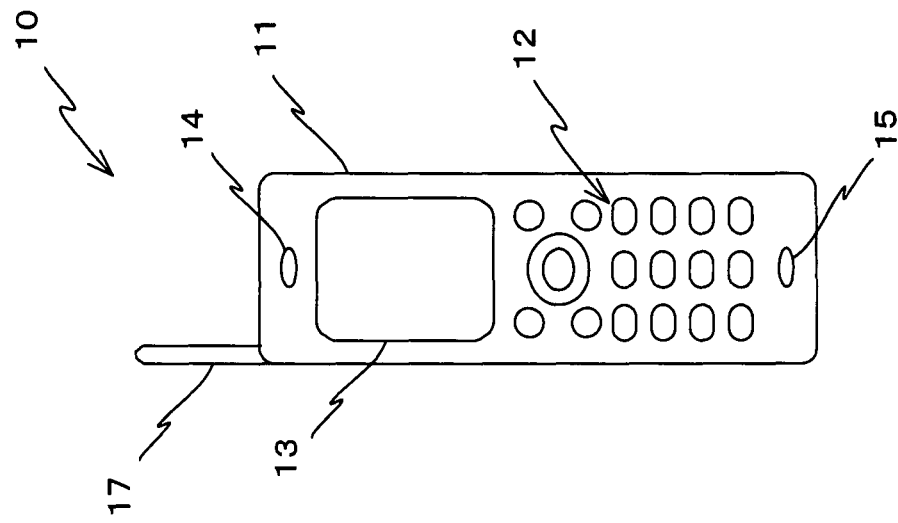

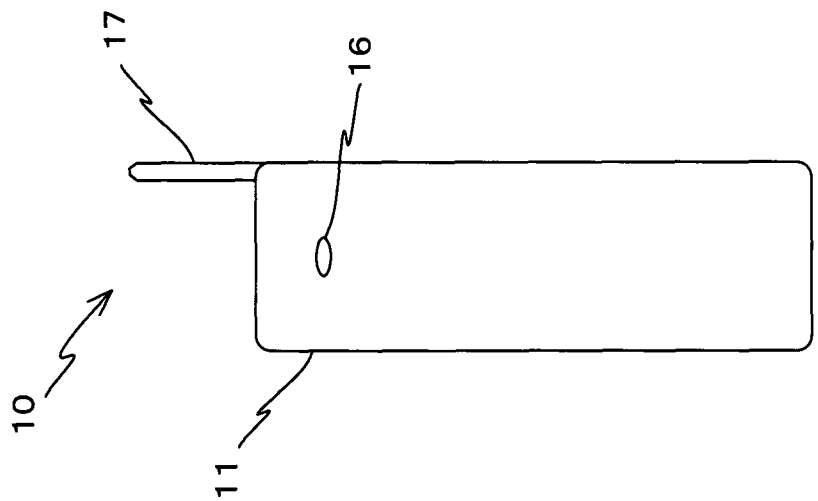

METHOD FOR ACCELERATION ESTIMATION, ACCELERATION ESTIMATING APPARATUS, AND MOBILE TERMINAL

RELATED APPLICATION

This is a continuation application of the international patent application No. PCT/JP2005/016112 filed with Application date: Sep. 2, 2005. The present application is based on, and claims priority from, J.P. Application 2004-259613, filed on Sep. 7, 2004, the disclosure of which is hereby incorporated by reference herein its entirety.

BACKGROUND OF THE INVENTION

The present invention relates to a method for acceleration estimation, an acceleration estimating apparatus, and a mobile terminal, and in particular, to a method for acceleration estimation of estimating a translation contributing acceleration which contributes to a translational movement of a moving object, and a rotation contributing acceleration which contributes to a rotational movement of the moving object, an acceleration estimating apparatus which uses the method for acceleration estimation, and a mobile terminal which includes the acceleration estimating apparatus.

BACKGROUND ART

Mobile terminals which can be operated while moving, of which a cellular phone is a typical example, have been hitherto used widely. There has been a remarkable improvement in a technology related to the mobile terminals, and particularly, the cellular phones. In addition to a communication function via a mobile communication network which is an indispensable function, applications such as various types of games and so forth can also be mounted in these mobile terminals.

Moreover, in the mobile terminal, mounting a sensor for measuring an acceleration which acts upon the mobile terminal, and using data measured by the sensor in an application, has been proposed. For example, a cellular phone which includes a sensor for measuring the acceleration, and which by using data of acceleration measured by the sensor, can find a trajectory of the movement, and can identify the trajectory of movement as input characters, has been proposed (refer to Patent Document 1: hereinafter, called as "conventional example"). Patent Literature: Japanese Patent Application Laid-open Publication No. 2002-169645

SUMMARY OF THE INVENTION

The conventional technology mentioned above is an excellent technology of using a result of measurement by a sensor in a mobile terminal. However, in this conventional example technology, in a case of describing a character trajectory, a user is required to perform a translational movement operation of the mobile terminal, which is almost not accompanied by a rotational movement, on a substantially two-dimensional plane. This involved a difficulty in operating for the user.

Moreover, an acceleration sensor which is installed in the mobile terminal used near a ground surface, normally detects a gravitational acceleration in a stationary state. Therefore, with the mobile terminal let to be in the stationary state, and a state in which only the gravitational acceleration is detected, is let to be an initial state, by observing a change in the acceleration all the time, specifying a direction of a gravitational force (vertically downward), and enabling to subtract the gravitation acceleration from a detection result, can also be taken into consideration. However, when a long time is elapsed from the initial state, it has been difficult to specify accurately the direction of the gravitational force. Therefore, only from the detection result from the acceleration sensor which is installed in a mobile terminal and so forth, having a variable attitude, the gravitational acceleration could not be subtracted easily from the detection result, and the acceleration which contributes to the movement could not be derived accurately.

Therefore, specifying the direction of the gravitational force accurately by providing a sensor which detects an attitude angle of the mobile terminal, by using a geomagnetism, can be considered. By specifying the direction of the gravitational force in this manner, the gravitational acceleration can be subtracted from the detection result from the acceleration sensor, but it is still difficult to separate an acceleration which contributes to a translational movement and an acceleration which contributed to a rotational movement.

The separation of the acceleration which contributes to the translational movement and the acceleration which contributes to the rotational movement not only shows a substantial effect in character input in which a detection of a trajectory of movement as in a conventional example is used, but also has a substantial potential from a point of view of enhancing an operation environment of the user in games etc. Therefore, at the moment, a technology for separating the acceleration which contributes to the translational movement and the acceleration which contributes to the rotational movement of a mobile terminal such as a cellular phone has been sought strongly.

The present invention is made in view of the circumstances mentioned above, and it is an object of the present invention to provide a method for acceleration estimation and an acceleration estimating apparatus which can estimate with an improved accuracy, a translation contributing acceleration which contributes to the translational movement of the moving object and a rotation contributing acceleration which contributes to the rotational movement of the moving object.

Moreover, it is an object of the present invention to provide a mobile terminal which can estimate with accuracy the translation contributing acceleration which contributes to the translational movement of the mobile terminal, and the rotation contributing acceleration which contributes to the rotational movement of the mobile terminal.

The present invention, according to a first view point is a method for acceleration estimation of estimating a translation contributing acceleration which contributes to a translational movement of a moving object in a measurement result of an acceleration along at least two axial directions from among a first axis, a second axis which is orthogonal to the first axis, and a third axis which is orthogonal to the first axis and the second axis, which are defined peculiarly for the moving object, and a rotation contributing acceleration which contributes to a rotational movement of the moving object, which comprises steps of:

collecting a measurement result of an acceleration along the two axes, and a measurement result of an attitude angle which is an angle of rotation from a reference attitude of the moving object; separating an acceleration frequency in a low-frequency acceleration component and a high-frequency acceleration component in the measurement result of the acceleration along at least two axes described above; deriving a rate of change of attitude angle in which a time rate of change of the attitude angle is derived; and estimating the translation contributing acceleration and the rotation contributing acceleration based on the high-frequency acceleration component, the low-frequency acceleration component, and the time rate of change of the attitude angle.

In this method for acceleration estimation, at the step of collecting the measurement results, the measurement result of the acceleration along direction of at least two axes from among the first axis, the second axis which is orthogonal to the first axis, and the third axis which is orthogonal to the first axis and the second axis, which are defined peculiarly for the moving object, and an angle of rotation from the reference attitude, in other words, the measurement result of the attitude angle of the moving object, are collected. Moreover, at the step of frequency separating the acceleration, the low-frequency acceleration component and the high-frequency acceleration component in each of the measurement results of acceleration are separated. Such frequency separation is performed by extracting for each of the measurement results of acceleration which is collected periodically, the low-frequency acceleration component by a method of moving average, and by extracting the high-frequency acceleration component by subtracting the low-frequency acceleration component which is extracted, from each of the measurement result of acceleration. Next, at the step of deriving the rate of change of attitude angle, the time rate of change of the attitude angle is derived.

Thus, when the extraction of the high-frequency acceleration component and the low-frequency acceleration component, and the deriving of the time rate of change of the attitude angle are completed, at the step of estimating the translation contributing acceleration and the rotation contributing acceleration, the translation contributing acceleration and the rotation contributing acceleration are estimated based on the high-frequency acceleration component, the low-frequency acceleration component, the attitude angle, and the time rate of change of the attitude angle. As a result of this, by using the attitude angle, the gravitational acceleration is subtracted from the low-frequency acceleration component, in conjunction with the evaluation of the magnitude of the rotation contributing acceleration by the time rate of change of the attitude angle, and general frequency characteristics of the translation contributing acceleration and the rotation contributing acceleration are taken into consideration, and the translation contributing acceleration and the rotation contributing acceleration are estimated.

Consequently, according to the method for acceleration estimation of the present invention, it is possible to estimate with improved accuracy, the translation contributing acceleration which contributes to the translational movement of the moving object, and the rotation contributing acceleration which contributes to the rotational movement of the moving object.

In the method for acceleration estimation of the present invention, the step of estimating the translation contributing acceleration and the rotation contributing acceleration can be let to comprise steps of estimating a high-frequency component, at which it is estimated that the high-frequency acceleration component does not includes a component of the rotation contributing acceleration, and includes only a component of the translation contributing acceleration, and estimating a low-frequency component, at which, when an absolute value of the time rate of change of the attitude angle is less than a predetermined value, it is estimated that a resultant obtained upon subtracting the gravitational acceleration from the low-frequency acceleration component does not include the component of the rotation contributing acceleration, and includes only the component of the translation contributing acceleration, and when the absolute value of the time rate of change of the attitude angle is not less than the predetermined value, it is estimated that the resultant obtained upon subtracting the gravitational acceleration from the low-frequency acceleration component, does not include the component of the translation contributing acceleration, and includes only the component of the rotation contributing acceleration.

In this case, at the step of estimating the translation contributing acceleration and the rotation contributing acceleration, first of all, at the step of estimating the high-frequency component, it is estimated that the high-frequency acceleration component does not include the component of the rotation contributing acceleration, and includes only the component of the translation contributing acceleration. This, in the mobile terminal such as a cellular phone, in a case of a manual rotational movement, is because a sudden change in a detection result of an acceleration sensor which is installed in the cellular phone and so forth is very unusual. Moreover, in a case of a manual translational movement, this is because it is normal for the translation contributing acceleration to include the high-frequency component.

Next, at the step of estimating the low-frequency component, in the step of estimating the translation contributing acceleration and the rotation contributing acceleration, a judgment of whether or not the absolute value of the time rate of change of the attitude angle is less than the predetermined value, is made. When the judgment is affirmative, a substantial translation contributing acceleration can be considered to be included in the resultant obtained upon subtracting the gravitational acceleration from the low-frequency acceleration component. Therefore, it is let to be estimated that the resultant obtained upon subtracting the gravitational acceleration from the low-frequency acceleration component does not include the component of the rotation contributing acceleration, and includes only the component of the translation contributing acceleration.

Whereas, when the judgment is negative, a substantial rotation contributing acceleration can be considered to be included in the resultant obtained upon subtracting the gravitational acceleration from the low-frequency acceleration component. Therefore, it is estimated that the resultant obtained upon subtracting the gravitational acceleration from the low-frequency acceleration component does not include the component of the translation contributing acceleration, and includes only the component of the rotation contributing acceleration.

As a result of this, according to the magnitude of the time rate of change of the attitude angle, a selection of whether the low-frequency acceleration component is let to be the rotation contributing acceleration or the translation contributing acceleration is made rationalistically. Consequently, it is possible to estimate with the improved accuracy, the translation contributing acceleration and the rotation contributing acceleration of the moving object.

Moreover, in the method for acceleration estimation of the present invention, at the step of deriving the rate of change of attitude angle, a low-frequency component of the time rate of change of the attitude angle is derived, and the step of estimating the translation contributing acceleration and the rotation contributing acceleration can be let to comprise: steps of estimating the high-frequency component at which it is estimated that the high-frequency acceleration component does not include the component of the rotation contributing acceleration; and includes only the component of the translation contributing acceleration, estimating a rotation contributing low-frequency component at which a rotation contributing low-frequency acceleration component which is a component of the rotation contributing acceleration in the low-frequency acceleration component is estimated based on the low-frequency component of the time rate of change of the attitude angle; and estimating a translation contributing low-frequency component at which it is estimated that a resultant obtained upon subtracting the rotation contributing low-frequency acceleration and the gravitational acceleration from the low-frequency acceleration component is a translation contributing low-frequency acceleration component which is a low-frequency component of the translation contributing acceleration component.

In this case, at the step of deriving the rate of change of attitude angle, the low-frequency component of the time rate of change of the attitude angle is derived. The low-frequency component of the time rate of change of the attitude angle is derived by using the method of moving average for an amount of change of each of the measurement results of the attitude angle, which is collected periodically.

Moreover, at the step of estimating the translation contributing acceleration and the rotation contributing acceleration, first of all, at the step of estimating the high-frequency component, similarly as in the case mentioned above, it is estimated that the high-frequency acceleration component does not include the component of the rotation contributing acceleration, and includes only the component of the translation contributing acceleration.

Next, at the step of estimating the rotation contributing low-frequency component, in the step of estimating the translation contributing acceleration and the rotation contributing acceleration, the rotation contributing low-frequency acceleration component which is a component of the rotation contributing acceleration in the low-frequency acceleration component is estimated based on the low-frequency component of the time rate of change of the attitude angle. Further, at the step of estimating the translation contributing low-frequency component, it is estimated that the resultant obtained upon subtracting the rotation contributing low-frequency acceleration component and the gravitational acceleration from the low-frequency acceleration component is the translation contributing low-frequency acceleration component which is a low-frequency component of the translation contributing acceleration.

Consequently, based on the magnitude of the time rate of change of the attitude angle, as compared to a case in which the low-frequency acceleration component is estimated to be only one of the rotation contributing acceleration and the translation contributing acceleration, it is possible to estimate with improved accuracy, the translation contributing acceleration which contributes to the translational movement of the moving object and the rotation contributing acceleration which contributes to the rotational movement of the moving object.

In the method for acceleration estimation of the present invention, at the step of deriving the rate of change of attitude angle, the low-frequency component in the time rate of change of the attitude angle and the high-frequency component in the time rate of change of the attitude angle can be let to be separated, and the step of estimating the translation contributing acceleration can be let to comprise: steps of estimating a rotation contributing high-frequency acceleration component which is a high-frequency component of the rotation contributing acceleration in the high-frequency acceleration component is estimated, based on a high-frequency component of the time rate of change of the attitude angle; estimating a translation contributing high-frequency component at which it is estimated that a resultant obtained upon subtracting the rotation contributing high-frequency acceleration component from the high-frequency acceleration component is a translation contributing high-frequency acceleration component which is a high-frequency component of the translation contributing acceleration; estimating rotation contributing low-frequency component at which a rotation contributing low-frequency acceleration component which is a low-frequency component of the rotation contributing acceleration in the low-frequency acceleration component is estimated based on the low-frequency component of the time rate of change of the attitude angle; and estimating a translation contributing low-frequency component at which it is estimated that a resultant obtained upon subtracting the rotation contributing low-frequency acceleration component and the gravitational acceleration from the low-frequency acceleration component is a translation contributing low-frequency acceleration component which is a low-frequency component of the translation contributing acceleration.

In this case, at the step of deriving the rate of change of attitude angle, the low-frequency component and the high-frequency component in the time rate of change of the attitude angle are separated. The frequencies of the time rate of change of the attitude angle are separated, and so forth, by deriving the low-frequency component by using the method of moving average for the amount of change of each of the measurement results of the attitude angle which are collected periodically, and by calculating the high-frequency component by subtracting the low-frequency component which is calculated, from the amount of change of the measurement result of the attitude angle.

Moreover, at the step of estimating the rotation contributing high-frequency component, in the step of estimating the translation acceleration and the rotation acceleration, the rotation contributing high-frequency acceleration component which is a high-frequency component of the rotation contributing acceleration in the high-frequency acceleration component is estimated, based on the high-frequency component of the time rate of change of the attitude angle. Moreover, at the step of estimating the translation contributing high-frequency component, it is estimated that a resultant obtained upon subtracting the rotation contributing high-frequency acceleration component from the high-frequency acceleration component is a translation contributing high-frequency acceleration component which is a high-frequency component of the translation contributing acceleration.

Furthermore, at the step of estimating rotation contributing low-frequency component, in the step of estimating the translation contributing acceleration and the rotation contributing acceleration, a rotation contributing low-frequency acceleration component which is a low-frequency component of the rotation contributing acceleration in the low-frequency acceleration component is estimated based on the low-frequency component of the time rate of change of the attitude angle. Moreover, at the step of estimating translation contributing low-frequency component, it is estimated that a resultant obtained upon subtracting the rotation contributing low-frequency acceleration component and the gravitational acceleration from the low-frequency acceleration component is a translation contributing low-frequency acceleration component which is a low-frequency component of the translation contributing acceleration.

Consequently, as compared to a case mentioned above of estimating the translation contributing acceleration and the rotation contributing acceleration only in the low-frequency acceleration component, it is possible to estimate with improved accuracy, the translation contributing acceleration which contributes to the translational movement of the moving object and the rotation contributing acceleration which contributes to the rotational movement of the moving object.

Moreover, in the method for acceleration estimation of the present invention, at the step of separating the acceleration frequency, a component which can be evaluated as a direct current component can be let to be extracted as the low-frequency acceleration component, and the step of estimating the translation contributing acceleration and the rotation contributing acceleration can be let to comprise: steps of estimating the low-frequency component, at which the low-frequency acceleration component is derived only from the gravitational acceleration, and estimating the high-frequency component, at which, when the absolute value of the time rate of change of the attitude angle is less than the predetermined value, it is estimated that the high-frequency acceleration component does not include the component of the rotation contributing acceleration which contributes to the rotational movement, and includes only the component of the translation contributing acceleration; and when the absolute value of the time rate of change of the attitude angle is not less than the predetermined value, it is estimated that the high-frequency component does not include the component of the translation contributing acceleration, and includes only the component of the rotation contributing acceleration.

In this case, at the step of separating the acceleration frequency, the component which can be evaluated as the direct current component is extracted as the low-frequency acceleration component.

At the step of estimating the low-frequency component, in the step of estimating the translation contributing acceleration and the rotation contributing acceleration, it is estimated that the low-frequency acceleration component is derived only from the gravitational acceleration. This is because, in a case of a manual movement of the cellular phone and so forth, it is considered to be normal that both the rotation acceleration and translation acceleration change constantly, although the change is small, and it is considered that the acceleration component which can be evaluated as the direct current component is derived from the gravitational force which acts on cellular phone in a stationary state. As a result of this, the high-frequency acceleration component is estimated to be a resultant obtained upon subtracting a contributing part of the gravitational acceleration from the measurement result of the acceleration.

Moreover, in the step of estimating the translation contributing acceleration and the rotation at the step of estimating the high frequency acceleration contributing acceleration, a judgment of whether or not the absolute value of the time rate of change of the attitude angle is less than the predetermined value is made. When the judgment is affirmative, the substantial translation contributing acceleration can be considered to be included in the high-frequency acceleration component. Therefore, it is let to be estimated that in the high-frequency acceleration component, the component of the rotation contributing acceleration is not included, and only the component of the translation contributing acceleration is included.

On the other hand, when the judgment is negative, the substantial rotation contributing acceleration can be considered to be included in the high-frequency acceleration component. Therefore, it is estimated that in the high-frequency acceleration component, the component of the translation contributing acceleration is not included, and only the component of the rotation contributing acceleration is included.

As a result of this, according to the magnitude of the time rate of change of the attitude angle, a selection of whether the high-frequency acceleration component which is a resultant obtained upon subtracting the contributing part of the gravitational acceleration from the measurement result of the acceleration, is let to be the rotation contributing acceleration or the translation contributing acceleration is made rationalistically. Consequently, it is possible to estimate with the improved accuracy, the translation contributing acceleration and the rotation contributing acceleration of the moving object.

Moreover, in the method for acceleration estimation of the present invention, at the step of separating the acceleration frequency, the component which can be evaluated as the direct current component can be let to be extracted as the low-frequency acceleration component, and the step of estimating the translation contributing acceleration and the rotation contributing acceleration component can be let to comprise: steps of estimating the low-frequency component, at which it is estimated that the low-frequency acceleration component is derived only from the gravitational acceleration; estimating the rotation contributing component, at which, a rotation contributing acceleration component which contributes to the rotational movement, in the high-frequency acceleration component is estimated based on the time rate of change of the attitude angle, and estimating the translation contributing component, at which it is estimated that a resultant obtained upon subtracting the rotation contributing acceleration component from the high-frequency acceleration component is the translation contributing acceleration component.

In this case, at the step of separating the acceleration frequency, the component which can be evaluated as the direct current component is extracted as the low-frequency acceleration component.

At the step of estimating the low-frequency component, in the step of estimating the translation contributing acceleration and the rotation contributing acceleration, it is estimated that the low-frequency acceleration component is derived only from the gravitational acceleration. As a result of this, the high-frequency acceleration component is estimated to be a resultant obtained upon subtracting the contributing part of the gravitational acceleration from the measurement result of the acceleration.

Moreover, at the step of estimating the rotation contributing component, in the step of estimating the translation contributing acceleration and the rotation contributing acceleration, the rotation contributing acceleration component is estimated based on the time rate of change of the attitude angle. Moreover, at the step of estimating the translation contributing component, it is estimated that the resultant obtained upon subtracting the rotation contributing acceleration component from the high-frequency acceleration component is the translation contributing acceleration component.

Consequently, based on the magnitude of the time rate of change of the attitude angle, as compared to a case in which the high-frequency acceleration component is estimated to be only one of the translation contributing acceleration and the rotation contributing acceleration, it is possible to estimate with improved accuracy the translation contributing acceleration which contributes to the translational movement of the moving object and the rotation contributing acceleration which contributes to the rotational movement of the moving object.

The present invention, according to a second view point is an acceleration estimating apparatus which estimates the translation contributing acceleration which contributes to the translational movement of the moving object in the measurement result of the acceleration along at least two axial directions from among the first axis, the second axis which is orthogonal to the first axis, and the third axis which is orthogonal to the first axis and the second axis, which are defined peculiarly for the moving object, and the rotation contributing acceleration which contributes to the rotational movement of the moving object, which comprises: a measurement result collecting means which collects the measurement result of acceleration along at least the two axes described above, and a measurement result of the attitude angle which is an angle of rotation from a reference attitude of the moving object; an acceleration frequency separating means, which separates an acceleration frequency in the low-frequency acceleration component and the high-frequency acceleration component in the measurement result of the acceleration at least along the two axes; an attitude angle change rate deriving means which derives the time rate of change of the attitude angle; and the translation rotation acceleration estimating means which estimates the translation contributing acceleration and the rotation contributing acceleration based on the high-frequency acceleration component, the low-frequency acceleration component, and the time rate of change of the attitude angle.

In this acceleration estimating apparatus, the measurement result collecting means collects the measurement results of acceleration along at least two axial directions from among the first axis, the second axis which is orthogonal to the first axis, and the third axis which is orthogonal to the first axis and the second axis, which are defined peculiarly for the moving object, and the measurement result of an angle of rotation from the reference attitude, in other words of the attitude angle of the moving object. Moreover, the acceleration frequency separating means separates the low-frequency acceleration component and the high-frequency acceleration component in each of the measurement result of the acceleration. Thus, when extraction of the high-frequency acceleration component and the low-frequency acceleration component, and deriving of the time rate of change of the attitude angle is completed, the translation rotation acceleration estimating means estimates the translation contributing acceleration and the rotation contributing acceleration based on the high-frequency acceleration component, the low-frequency acceleration component, the attitude angle, and the time rate of change of the attitude angle. As a result of this, by using the attitude angle, the gravitational acceleration is subtracted from the low-frequency acceleration component, in conjunction with the evaluation of the magnitude of the rotation contributing acceleration by the time rate of change of the attitude angle, and the general frequency characteristics of the translation contributing acceleration and the rotation contributing acceleration are taken into consideration, and the translation contributing acceleration and the rotation contributing acceleration are estimated.

In other words, in the acceleration estimating apparatus of the present invention, by using the method for acceleration estimation, the translation contributing acceleration which contributes to the translational movement of the moving object, and the rotation contributing acceleration which contributes to the rotational movement of the moving object can be estimated. Consequently, according to the acceleration estimating apparatus of the present invention, it is possible to estimate with the improved accuracy, the translation contributing acceleration which contributes to the translational movement of the moving object, and the rotation contributing acceleration which contributes to the rotational movement of the moving object.

The acceleration estimating apparatus of the present invention can be let to have a structure such that the translation rotation acceleration estimating means comprises a high-frequency component estimating means which estimates that the high-frequency acceleration component does not include the component of the rotation contributing acceleration, and includes only the component of the translation contributing acceleration, and a low-frequency component estimating means, which, when the absolute value of the time rate of change of the attitude angle is less than the predetermined value, estimates that the resultant obtained upon subtracting the gravitational acceleration from the low-frequency acceleration component does not include the component of the rotation contributing acceleration, and includes only the component of the translation contributing acceleration, and when the absolute value of the time rate of change of the attitude angle is not less than the predetermined value, estimates that the resultant obtained upon subtracting the gravitational acceleration from the low-frequency acceleration component does not include the component of the translation contributing acceleration, and includes only the component of the rotation contributing acceleration.

In this case, the high-frequency component estimating means in the translation rotation acceleration estimating means estimates that the high-frequency acceleration component does not include the component of the rotation contributing acceleration, and includes only the component of the translation contributing acceleration. Moreover, the low-frequency component estimating means in the translation rotation acceleration estimating means makes a judgment of whether or not the absolute value of the time rate of change of the attitude angle is less than the predetermined value. When the judgment is affirmative, the low-frequency component estimating means estimates that the resultant obtained upon subtracting the gravitational acceleration from the low-frequency acceleration component, does not include the component of the rotation contributing acceleration, and includes only the component of the translation contributing acceleration. On the other hand, when the judgment is negative, the low-frequency component estimating means estimates that the resultant obtained upon subtracting the gravitational acceleration from the low-frequency acceleration component does not include the component of the translation contributing acceleration, and includes only the component of the rotation contributing acceleration.

As a result of this, according to the magnitude of the time rate of change of the attitude angle, the selection of whether the low-frequency acceleration component is let to be the rotation contributing acceleration or the translation contributing acceleration is made rationalistically. Consequently, it is possible to estimate with the improved accuracy, the translation contributing acceleration and the rotation contributing acceleration of the moving object.

Moreover, in the acceleration estimating apparatus of the present invention, the attitude angle change rate deriving means can be let to derive the low-frequency component of the time rate of change of the attitude angle, and the acceleration estimating apparatus can be structured such that the translation rotation acceleration estimating means comprises: a high-frequency component estimating means which estimates that the high-frequency acceleration component does not include the component of the rotation contributing acceleration, and includes only the component of the translation contributing acceleration; a rotation contributing low-frequency component estimating means which estimates the rotation contributing low-frequency acceleration component which is a component of the rotation contributing acceleration in the low-frequency acceleration component, based on the low-frequency component of the time rate of change of the attitude angle; and a translation contributing low-frequency component estimating means which estimates that the resultant obtained upon subtracting the rotation contributing low-frequency acceleration component and the gravitational acceleration from the low-frequency acceleration component is a translation contributing low-frequency acceleration component which is a low-frequency component of the translation contributing acceleration.

In this case, the attitude angle change rate deriving means derives the low-frequency component of the time rate of change of the attitude angle. Moreover, the high-frequency component estimating means in the translation rotation acceleration estimating means, similarly as in the case mentioned above, estimates that the high-frequency acceleration component does not include the component of the rotation contributing acceleration and includes only the component of the translation contributing acceleration.

Moreover, the rotation contributing low-frequency component estimating means in the translation rotation acceleration estimating means, estimates the rotation contributing low-frequency acceleration component which is the component of the rotation contributing acceleration in the low-frequency acceleration component, based on the low-frequency component of the time rate of change of the attitude angle. Further, the translation contributing low-frequency component estimating means estimates that the resultant obtained upon subtracting the rotation contributing low-frequency acceleration component and the gravitational acceleration from the low-frequency acceleration component is the translation contributing low-frequency acceleration component which is the low-frequency component of the translation contributing acceleration.

Consequently, based on the magnitude of the time rate of change of the attitude angle, as compared to the case in which the low-frequency acceleration component is estimated to be only one of the translation contributing acceleration and the rotation contributing acceleration, it is possible to estimate with the improved accuracy, the translation contributing acceleration which contributes to the translational movement of the moving object and the rotation contributing acceleration which contributes to the rotational movement of the moving object.

Moreover, in the acceleration estimating apparatus of the present invention, the attitude angle change rate deriving means may be let to separate the low-frequency component and the high-frequency component in the time rate of change of the attitude angle, and the acceleration estimating apparatus can let to be structured such that the translation rotation acceleration estimating means comprises: a rotation contributing high-frequency component estimating means which estimates the rotation contributing high-frequency acceleration component which is the high-frequency component of the rotation contributing acceleration in the high-frequency acceleration component, based on the high-frequency component of the time rate of change of the attitude angle; a translation contributing high-frequency component estimating means which estimates that the resultant obtained upon subtracting the rotation contributing high-frequency acceleration component from the high-frequency acceleration component is the translation contributing high-frequency acceleration component which is a high-frequency component of the translation contributing acceleration; a rotation contributing low-frequency component estimating means which estimates the rotation contributing low-frequency acceleration component which is a low-frequency component of the rotation contributing acceleration in the low-frequency acceleration component, based on the low-frequency component of the time rate of change of the attitude angle; and a translation contributing low-frequency component estimating means which estimates that the resultant obtained upon subtracting the rotation contributing low-frequency acceleration component and the gravitational acceleration from the low-frequency acceleration component is the translation contributing low-frequency acceleration component which is a low-frequency component of the translation contributing acceleration.

In this case, the attitude angle change rate deriving means separates the low-frequency component and the high frequency component in the time rate change of the attitude angle. Moreover, the rotation contributing high-frequency component estimating means in the translation rotation acceleration estimating means estimates the rotation contributing high-frequency acceleration component which is the high-frequency component of the rotation contributing acceleration in the high-frequency acceleration component, based on the high-frequency component of the time rate of change of the attitude angle. Moreover, the translation contributing high-frequency component estimating means estimates that the resultant obtained upon subtracting the rotation contributing high-frequency acceleration component from the high-frequency acceleration component is the translation contributing high-frequency acceleration component which is the high frequency component of the translation contributing acceleration.

Furthermore, the rotation contributing low-frequency component estimating means in the translation rotation acceleration estimating means estimates the rotation contributing low-frequency acceleration component which is the component of the rotation contributing acceleration in the low-frequency acceleration component, based on the low-frequency component of the time rate of change of the attitude angle. Moreover, the translation contributing low-frequency component estimating means estimates that the resultant obtained upon subtracting the rotation contributing low-frequency acceleration component and the gravitational acceleration from the low-frequency acceleration component is the translation contributing low-frequency acceleration component which is the low-frequency component of the translation contributing acceleration.

Consequently, as compared to the case mentioned above of estimating the translation contributing acceleration and the rotation contributing acceleration only in the low-frequency acceleration component, it is possible to estimate with further improved accuracy, the translation contributing acceleration which contributed to the translational movement of the moving object and the rotation contributing acceleration which contributes to the rotational movement of the moving object.

Moreover, in the acceleration estimating apparatus of the present invention, the acceleration frequency separating means can be let to extract the component which can be evaluated as the direct current component, as the low-frequency acceleration component, and the translation rotation acceleration estimating means can be let to comprise a low-frequency component estimating means which estimates that the low-frequency acceleration component is derived only from the gravitational acceleration, a high-frequency component estimating means which, when the absolute value of the time rate of change of the attitude angle is less than the predetermined value, estimates that the high-frequency acceleration component does not include the component of the rotation contributing acceleration which contributes to the rotational movement, and includes only the component of the translation contributing acceleration, and when the absolute value of the time rate of change of the attitude angle is not less than the predetermined value, estimates that the high-frequency component does not include the component of the translation contributing acceleration, and includes only the component of the rotation contributing acceleration.

In this case, the acceleration frequency separating means extracts the component which can be evaluated as the direct current component, as the low-frequency acceleration component.

In the translation rotation acceleration estimating means, the low-frequency component estimating means estimates that the low-frequency acceleration component is derived only from the gravitational acceleration. As a result of this, the high-frequency acceleration component is estimated to be a resultant obtained upon subtracting the contributing part of the gravitational acceleration from the measurement result of the acceleration.

Moreover, in the translation rotation acceleration estimating means, the high-frequency component estimating means makes a judgment of whether or not the absolute value of the time rate of change of the attitude angle is less than the predetermined value. When the judgment is affirmative, the high-frequency component estimating means estimates that in the high-frequency acceleration component, the component of the rotation contributing acceleration is not included, and the component of the translation contributing acceleration is included. Whereas when the judgment is negative, the high-frequency component estimating means estimates that in the high-frequency acceleration component, the component of the translation contributing acceleration is not included, and the component of the rotation contributing acceleration is included.

As a result of this, according to the magnitude of the time rate of change of the attitude angle, the selection of whether the high-frequency acceleration component which is the resultant obtained upon subtracting the contributing part of the gravitational acceleration from the measurement result of the acceleration, is let to be the rotation contributing acceleration or the translation contributing acceleration is made rationalistically. Consequently, it is possible to estimate with the improved accuracy, the translation contributing acceleration and the rotation contributing acceleration of the moving object.

Moreover, in the acceleration estimating apparatus of the present invention, the acceleration frequency separating means can be let to extract the component which can be evaluated as the direct current component, as the low-frequency acceleration component, and the translation rotation acceleration estimating means can be let to comprise: a low-frequency component estimating means which estimates that the low-frequency acceleration component is derived only from the gravitational acceleration; a rotation contributing component estimating means which estimates the rotation contributing acceleration component which contributes to the rotational movement in the high-frequency acceleration component, based on the time rate change of the attitude angle; and a translation contributing component estimating means which estimates that the resultant obtained upon subtracting the rotation contributing acceleration component from the high-frequency acceleration component is the translation contributing acceleration component.

In this case, the acceleration frequency separating means extracts the component which can be evaluated as the direct current component, as the low-frequency acceleration component.

In the translation rotation acceleration estimating means, the low-frequency component estimating means estimates that the low-frequency acceleration component is derived only from the gravitational acceleration. As a result of this, the high-frequency acceleration component is estimated to be the resultant obtained upon subtracting the contributing part of the gravitational acceleration from the measurement result of the acceleration.

Moreover, in the translation rotation acceleration estimating means, the rotation contributing component estimating means estimates the rotation contributing acceleration component based on the time rate of change of the attitude angle. Furthermore, the translation contributing component estimating means estimates that the resultant obtained upon subtracting the rotation contributing acceleration component from the high-frequency acceleration component is the translation contributing acceleration component.

Consequently, based on the magnitude of the time rate of change of the attitude angle, as compared to the case in which the high-frequency acceleration component is estimated to be only one of the translation contributing acceleration and the rotation contributing acceleration, it is possible to estimate with the improved accuracy, the translation contributing acceleration which contributes to the translational movement of the moving object and the rotation contributing acceleration which contributes to the rotational movement of the moving object.

The mobile terminal of the present invention is characterized by comprising the acceleration estimating apparatus of the present invention, in the mobile terminal which can be operated while moving. In this mobile terminal, the translation contributing acceleration which contributes to the translational movement of the mobile terminal, and the rotation contributing acceleration which contributes to the rotational movement of the mobile terminal are estimated by using the acceleration estimating apparatus of the present invention. Consequently, according to the mobile terminal of the present invention, it is possible to estimate with the improved accuracy, the translation contributing acceleration which contributes to the translational movement of the mobile terminal, and the rotation contributing acceleration which contributes to the rotational movement of the mobile terminal.

Thus, as mentioned above, according to a method for acceleration estimating and an acceleration estimating apparatus of the present invention, there is shown an effect of estimating with an improved accuracy, a translation contributing acceleration which contributes to a translational movement of the moving object, and a rotational contributing acceleration which contributes to a rotational movement of the moving object.

Moreover, according to a mobile terminal of the present invention, it is possible to estimate with improved accuracy, the translation contributing acceleration which contributes to the translational movement of the mobile terminal, and the rotation contributing acceleration which contributes to the rotational movement of the mobile terminal.

BRIEF DESCRIPTION OF THE DRAWINGS

FIG. 1A is a front view showing schematically an external structure of a cellular phone according to a first embodiment;

FIG. 1B is a rear view showing schematically the external structure of the cellular phone according to the first embodiment of the present invention;

DETAILED DESCRIPTION

<First Embodiment>

Figure 2:
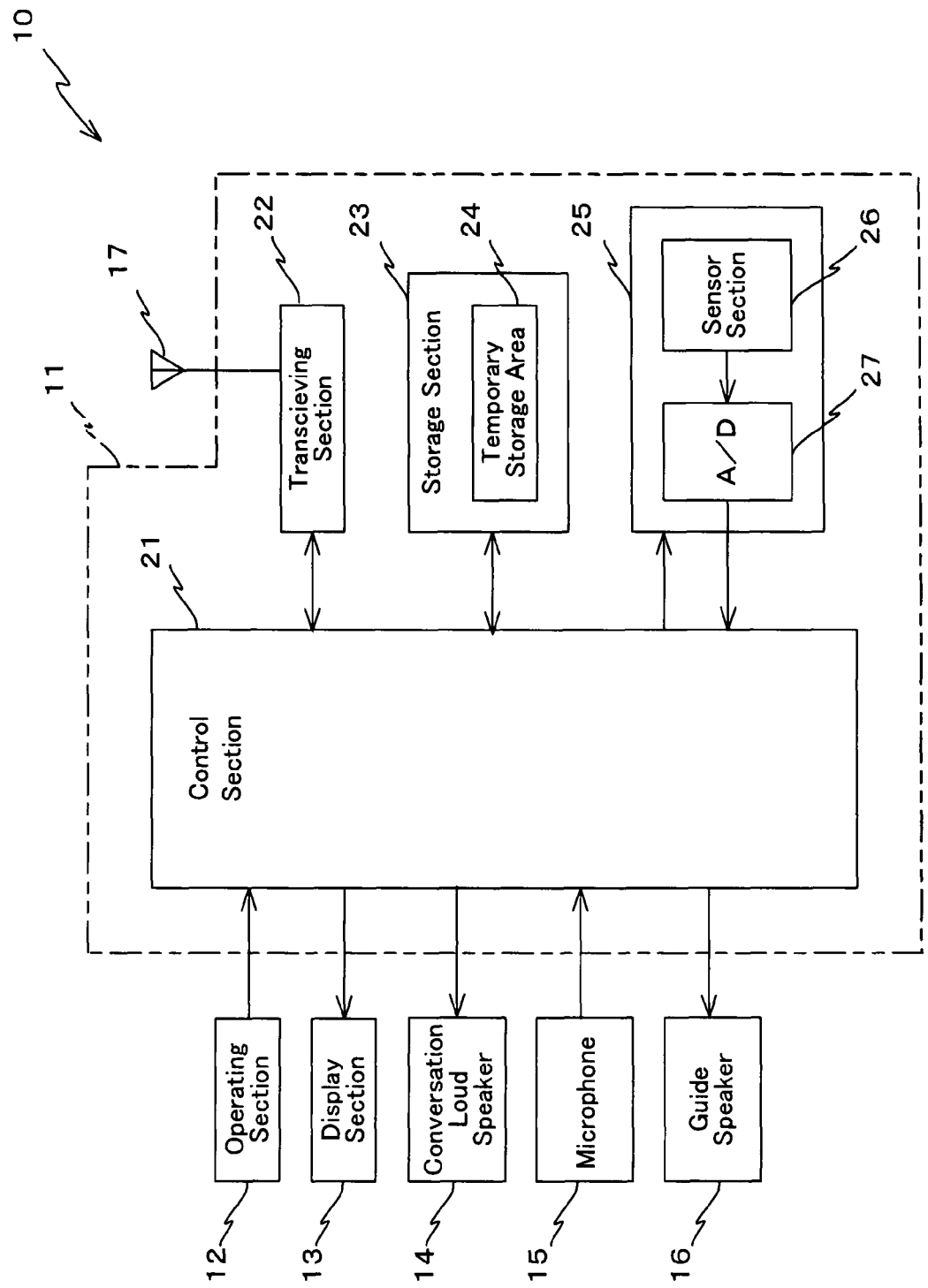
FIG. 2 is a functional block diagram for describing a structure of the cellular phone of FIG. 1A and FIG. 1B.

A first embodiment of the present invention will be described below by referring to diagrams from FIG. 1A to FIG. 7.

FIG. 1A and FIG. 1B show schematically an external structure of a cellular phone 10 which is a mobile terminal. In this embodiment, in FIG. 1A, a front view of the external structure of the cellular phone is shown, and in FIG. 1B, a rear view of the external structure of the cellular phone is shown.

As it is shown comprehensively in FIG. 1A and FIG. 1B, the cellular phone 10 includes (a) a cellular phone main body 11, (b) a numerical keypad for inputting a telephone number, and an operating section 12 which has function keys for inputting in a control section 21 (refer to FIG. 2) which will be described later, various types of commands such as switching an operation mode, and (c) a display section 13 which has a liquid-crystal display which displays operating instructions, operation status, and message received and so forth. Moreover, the cellular phone 10 includes (d) a speaker for conversation 14 which reproduces an aural signal transmitted from a communication counterpart during conversation, (e) a microphone 15 for inputting sound while collecting the sound, and inputting voice during conversation, (f) a speaker for instructions 16 for generating a ring tone and an instruction tone, and (g) an antenna 17 for transcieving a wireless signal between the cellular phone 10 and a base station.

As shown in FIG. 2, the cellular phone main body 11 includes inside the body (i) the control section 21 which performs integrated control of the operation of the entire cellular phone 10, (ii) a transcieving section 22 which transmits and receives a wireless signal to and from the base station via the antenna 17, and (iii) a storage section 23 which has a read only memory (ROM) device and a random access memory (RAM) device, which stores various data and a computer program executed by the control section 21. Moreover, the cellular phone main body 11 includes in the main body (iv) a sensor unit 25 for measuring an acceleration which acts on the cellular phone 10, and an attitude angle of the cellular phone 10.

The storage section 23 includes a temporary storage area 24, which stores temporarily measured data which is collected, inside of itself.

The sensor unit 25 includes a sensor section 26 which detects the acceleration acting on the cellular phone 10 and the attitude angle of the cellular phone 10, and outputs as an analog voltage signal, and an A/D (analog to digital) converter 27 which converts a voltage value of the voltage signal from the sensor section 26 to a digital value. Moreover, digital data output from the A/D converter 27 is notified to the control section 21, as measured data. Furthermore, the sensor unit 25 starts operation by a measurement-start command from the control section 21, and stops operation by a measurement-stop command from the control section 21.

The sensor section 26, with a line-wise direction and a column-wise direction in a key arrangement in a matrix form of the operating section 12 as an X axis and a Y axis respectively, and in the first embodiment, an XY plane is parallel to a horizontal plane, and letting an attitude in which a +Y direction is a due south direction, to be a reference attitude, detects an angle of rotation from the reference attitude, in other words, the sensor section 26 detects an amount of electromagnetism corresponding to a pitch angle $\theta_X$, a roll angle $\theta_Y$, and a yaw angle $\theta_Z$ which are attitude angles with respect to the reference attitude. Moreover, the sensor section 26 detects the amount of electromagnetism corresponding to acceleration ($\alpha_X$) in the X direction, and acceleration ($\alpha_Y$) in the Y direction. Furthermore, the sensor unit 25 makes one set of detection results corresponding to the pitch angle $\theta_X$, the roll angle $\theta_Y$, the yaw angle $\theta_Z$, the acceleration ($\alpha_X$) in the X direction, and the acceleration ($\alpha_Y$) in the Y direction detected at a time of each measurement, and notifies the set of detection results as measured raw data to the control section 21.

Figure 3:
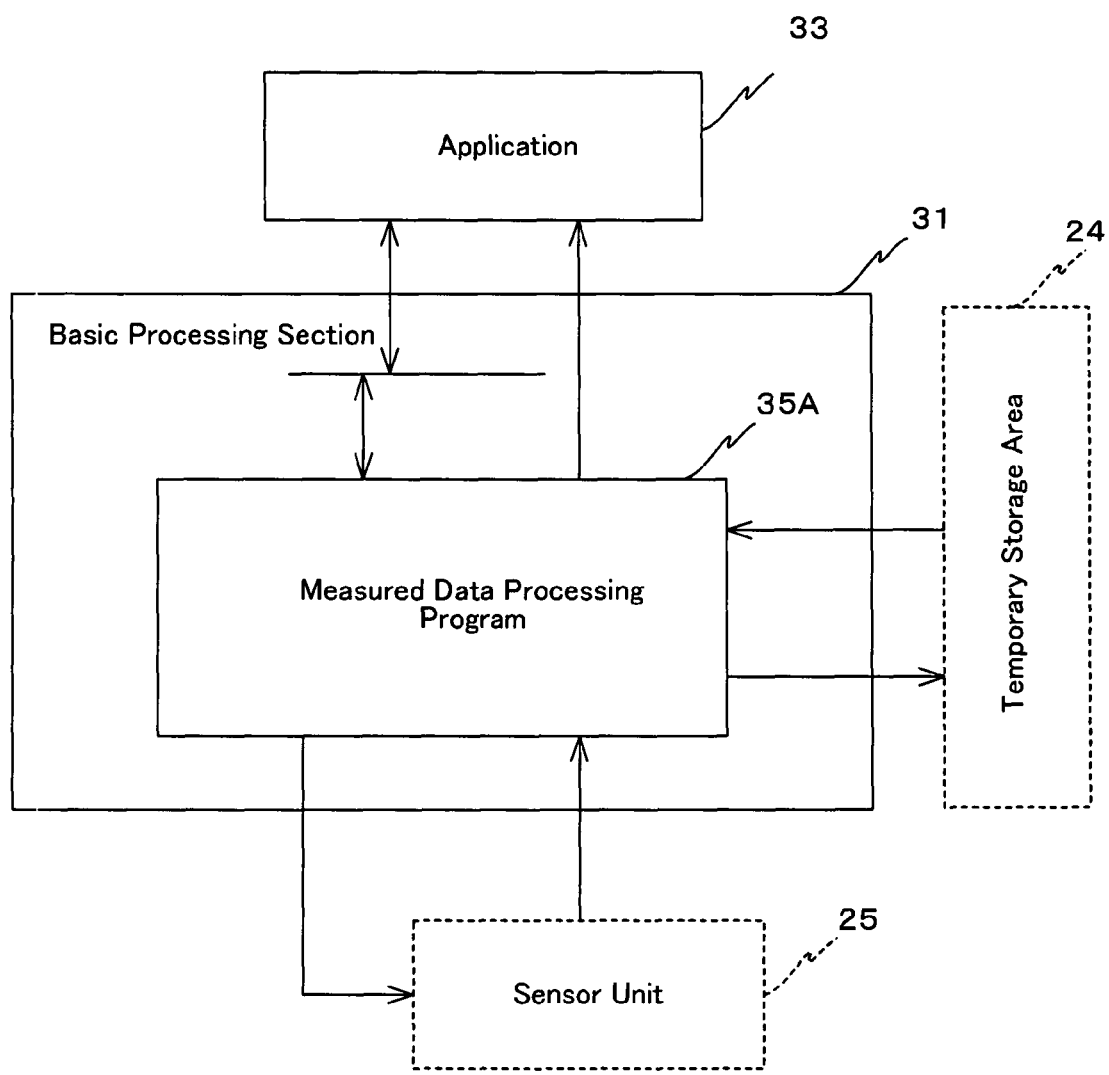
FIG. 3 is a diagram for describing a configuration of software which is executed in a control section in FIG. 2.

The control section 21 includes a central processing unit (CPU) and a digital signal processor (DSP), and for realizing general cellular phone functions, performs various data-processing and an operation control of other components mentioned above. A software configuration of a computer program and so forth which is executed in the control section 21 is as shown in FIG. 3.

In other words, a software in the control section 21 includes (i) a basic processing section 31 which realizes functions such as a conversation function, a mail function, and a character input function, which are basic functions as a cellular phone, and controls various hardware resources mentioned above, and (ii) an application 33 for providing various contents such as games, to a user. In this case, the application 33 is let to be an application which uses the measurement result from the sensor unit 25.

The basic processing section 31 includes a measured data processing computer program 35A. The measured data processing computer program 35A collects the measured raw data from the sensor unit 25 according to a measured data processing command from the application 33, then performs processing such as estimating a translation contributing acceleration which contributes to a translational movement of the cellular phone 10 and a rotation contributing acceleration which contributes to a rotational movement of the cellular phone 10, and stores it in the temporary storage area 24 inside the storage section 23. Moreover, according to a request for the measured data from the application 33, the basic processing section 31 sends to the application 33, the processed measured data which is stored in the temporary storage area 24 inside the storage section 23.

Figure 4:
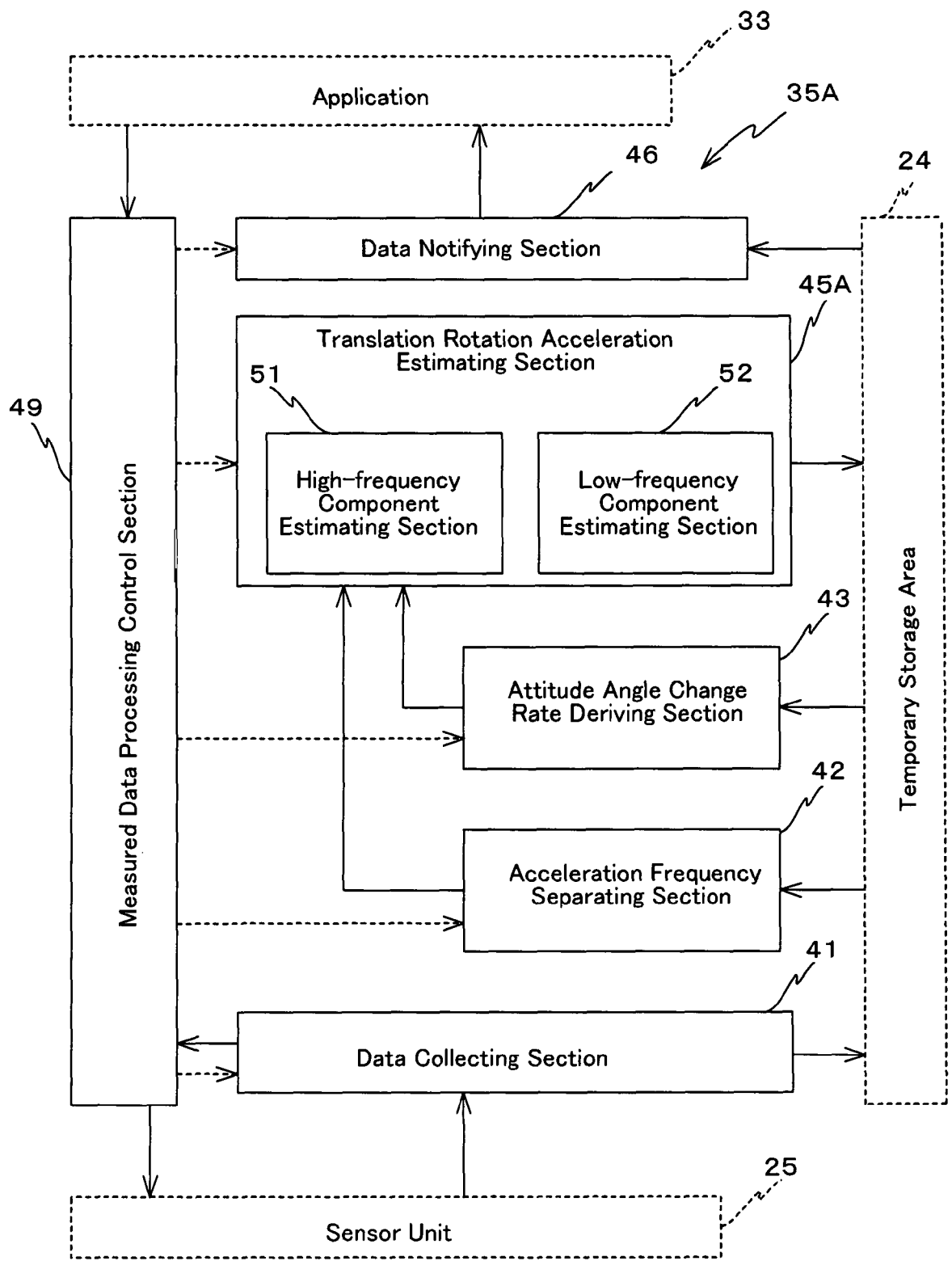
FIG. 4 is a functional block diagram for describing a configuration of a measured data processing computer program in FIG. 3.

The measured data processing program 35A, as shown in FIG. 4, includes (i) a measured data processing control section 49 which performs an integrated control of an operation of the sensor unit 25 and the entire measured data processing program 35A, and (ii) a data collecting section 41 which receives the measured raw data from the sensor unit 25, converts it to physical value data such as the acceleration and the attitude angle, and stores in the temporary storage area 24 as measured physical value data. Moreover, the measured data processing program 35A includes (iii) an acceleration frequency separating section 42 which separates a low-frequency acceleration component and a high-frequency acceleration component in acceleration data in the measured physical value data, and (iv) an attitude angle change rate deriving section 43 which derives a time rate of change in each attitude angle data in the measured physical value data.

In this embodiment, the acceleration frequency separating section 42 reads out a predetermined number of recent data (10 for example), and finds a low-frequency acceleration component by calculating a moving average deviation. Next, the acceleration frequency separating section 42 finds a high-frequency acceleration component by subtracting the low-frequency acceleration component from acceleration data at a point of time at which it is estimated to include the calculated low-frequency acceleration component. Moreover, the attitude angle change rate deriving section 43 derives the time rate of change of the attitude angle at the point of time at which it is estimated to include the calculated low-frequency acceleration component by calculating a difference between the attitude angle immediately before and immediately after the point of time at which it is estimated to include the calculated low-frequency acceleration component.

Moreover, the measured data processing computer program 35A includes (v) a translation rotation acceleration estimating section 45A which estimates the translation contributing acceleration and the rotation contributing acceleration, based on the high-frequency acceleration component, the low-frequency acceleration component, the attitude angle, and the time rate of change of the attitude angle, and (vi) a data notifying section 46 which notifies to the application 33, the latest translation contributing acceleration, the rotation contributing acceleration, and the attitude angle, according to the request for the measured data from the application 33.

The translation rotation acceleration estimating section 45A includes a high-frequency component estimating section 51 and a low-frequency component estimating section 52. In this case, the high-frequency component estimating section 51 estimates that the high-frequency acceleration component includes only the translation contributing acceleration. This, in the cellular phone 10, in a case of a manual rotational movement, is because a sudden change in the detection result of the acceleration sensor installed in the cellular phone and so forth is very unusual. Moreover, in a case of a manual translational movement, this is because it is normal that the translation contributing acceleration includes the high-frequency component.

Moreover, when the time rate of change of the attitude angle is less than the predetermined value, the low-frequency component estimating section 52 estimates that a resultant obtained upon subtracting the gravitational acceleration from the low-frequency acceleration component includes only the translation contributing acceleration. This is because, when the time rate of change of the attitude angle is less than the predetermined value, it is considered that the resultant obtained upon subtracting the gravitational acceleration from the low-frequency acceleration component includes substantially the translation contributing acceleration, and includes only a small amount of the rotation contributing acceleration.

Whereas, when the time rate of change of the attitude angle is not less than the predetermined value, the low-frequency component estimating section 52 estimates that the resultant obtained upon subtracting the gravitational acceleration from the low-frequency acceleration component includes only the rotation contributing acceleration. This is because, when the time rate of change of the attitude angle is not less than the predetermined value, it is considered that the resultant obtained upon subtracting the gravitational acceleration from the low-frequency acceleration component includes substantially the rotation contributing acceleration, and includes only a small amount of the translation contributing acceleration.

Note that the predetermined value is determined by experiments and evaluation performed in advance.

Figure 6:
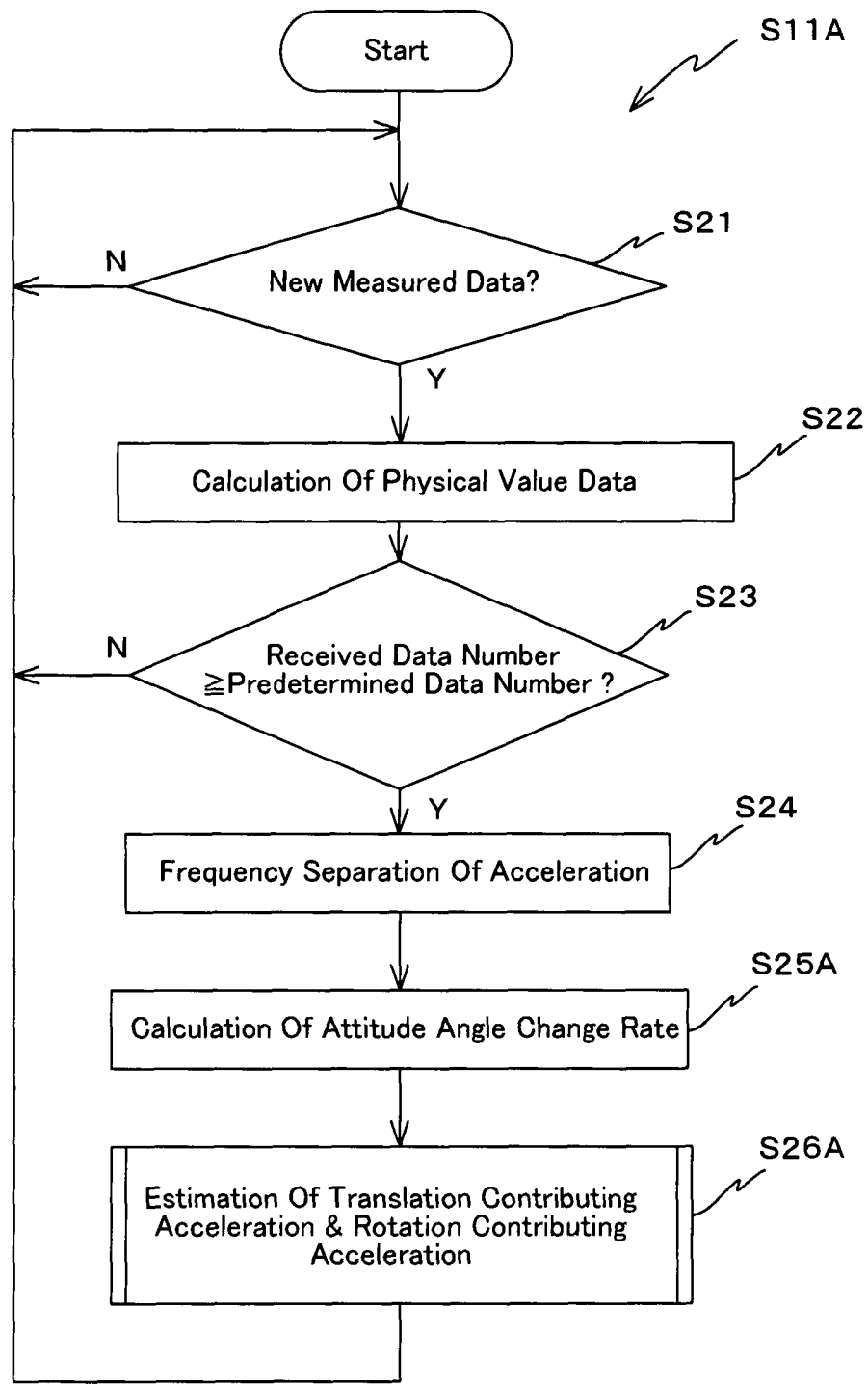
FIG. 6 is a flowchart for describing a process at a measured data processing step in FIG. 5.
Figure 7:
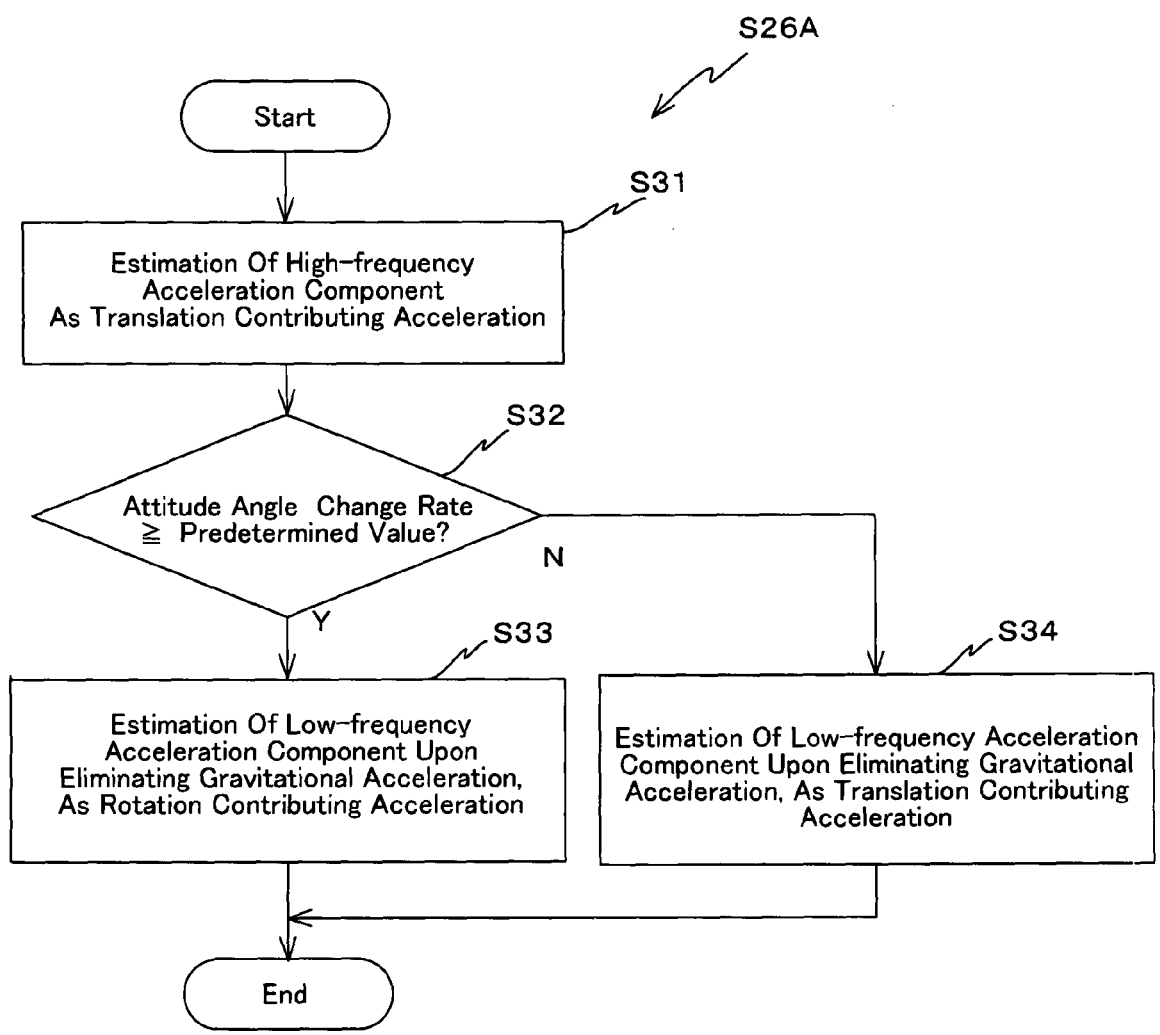
FIG. 7 is a flowchart for describing a process at a step of estimating a translation contributing acceleration and a rotation contributing acceleration in FIG. 6.

Next, the processing of the measured data in the movable terminal apparatus 10 which is structured as described above will be described by referring mainly to diagrams from FIG. 5 to FIG. 7, and the other diagrams when deemed appropriate.

Figure 5:
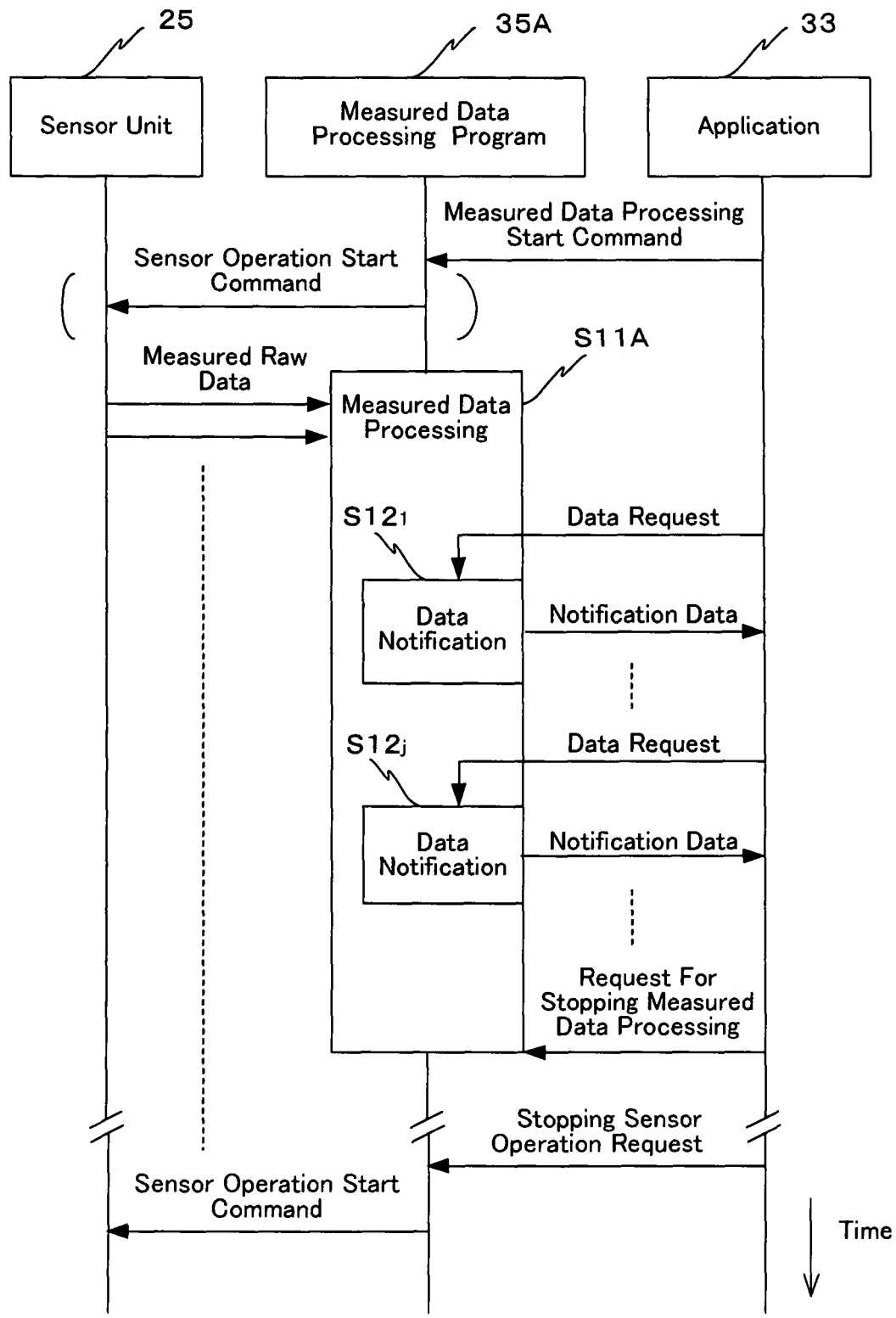
FIG. 5 is sequence diagram for describing a measured data processing in the cellular phone in FIG. 1A and FIG. 1B.

In the processing of the measured data in the cellular phone 10, as shown in FIG. 5, to start with, the application 33 sends a measured-data processing start command to the measured data processing computer program 35A. In the measured data processing computer program 35A, the measured data processing control section 49 receives the measured-data processing start command. Further, the measured data processing control section 49 analyzes the command from the application 33, and identifies the command to be the measured data processing start command. Next, the measured data processing control section 49 makes a judgment of whether or not the sensor unit 25 is in operation. When the judgment is negative, the measured data processing control section 49 sends a sensor-operation start command to the sensor unit 25.

When the sensor unit 25 receives the sensor-operation start command, the sensor unit 25 starts a sensor operation, and after the detection result from the sensor section 26 is digitized by the A/D converter 27, digitized data is output periodically (1 msec cycle, for example) to the control section 21 (in particular, to the data collecting section 41), as the measured raw data.

After this, the measured data processing computer program 35A starts measured data processing of step S11A. At step S11A, as shown in FIG. 6, first of all, at step S21, the data collecting section 41 which has received a measured-data collecting start command from the measured data processing control section 49, makes a judgment of whether or not new measured raw data is received from the sensor unit 25. When the judgment is negative, a process at step S21 is repeated.

Further, when the data collecting section 41 receives the new measured raw data from the sensor unit 25, and an affirmative judgment is made at step S21, the process is advanced to step S22. At step S22, the data collecting section

41, based on the measured raw data which is received newly, calculates physical value data which directly indicates a magnitude of the acceleration and the attitude angle. Moreover, the data collecting section 41 stores in the temporary storage area 24, the calculated physical value data as new measured physical data. Thus, when the storage of the new measured physical value data in the temporary storage area 24 is completed, the data collecting section 41 notifies the completion of storage to the measured data processing control section 49. A storage area for the measured physical value data in the temporary storage area 24 has a size which can store not less than a predetermined number of sets of the measured physical value data, which will be described later, and is let to be a so-called ring buffer.

Next, at step S23, the measured data processing control section 49 makes a judgment of whether or not the acceleration frequency separating section 42 has received measured raw data of not less than a predetermined number, for calculating a moving average, in other words whether or not the measured physical value data of not less than predetermined number is stored in the temporary storage area 24. When the judgment is negative, the process is moved to step S21. Further, the process in steps from step S21 to S23 is repeated until an affirmative judgment is made at step S23. When the judgment at step S23 is affirmative, the process is advanced to step S24. In the process at step S11A, when the affirmative judgment is made once at step S23, a status in which the measured physical value data of not less than predetermined number is stored in the temporary storage area 24, is continued. Therefore, when step S23 is executed later, the affirmative judgment is made.

At step S24, the acceleration frequency separating section 42 which has received the command from the measured data processing control section 49 separates the high-frequency acceleration component and the low-frequency acceleration component based on acceleration data in the measured physical value data. At the time of separating the high-frequency acceleration component and the low-frequency acceleration component, the acceleration frequency separating section 42, first of all, for each of X-axis direction acceleration data and Y-axis direction acceleration data, reads out from the temporary storage area 24, a predetermined number of data in order from the latest data respectively. Next, the acceleration frequency separating section 42 finds the low-frequency acceleration component by calculating the moving average, for each of the X-axis direction acceleration data and the Y-axis direction acceleration data. Further, the acceleration frequency separating section 42 finds the high-frequency acceleration component at a point of time at which the calculated moving average deviation is let to be the low-frequency acceleration component, by subtracting the low-frequency acceleration component from the acceleration data at the point of time at which the calculated moving average deviation is let to be the low-frequency acceleration component.

Thus, the high-frequency acceleration component and the low-frequency acceleration component in each of the X-axis direction acceleration data and the Y-axis direction acceleration data at the point of time are separated. The acceleration frequency separating section 42 sends the separated high-frequency acceleration component and the low-frequency acceleration component to the translation rotation acceleration estimating section 45A.

Next, at step S25A, the attitude angle change rate deriving section 43 which has received the command from the measured data processing control section 49, based on attitude angle data in the measured physical value data, derives the time rate of change of each of the attitude angles at a point of time at which the low-frequency acceleration component was calculated. At the time of deriving the time rate change of each of the attitude angle, first of all, the attitude angle change rate deriving section 43 reads out the attitude angle data immediately before and immediately after the point of time, from the temporary storage area 24. Next, the attitude angle change rate deriving section 43 subtracts the corresponding attitude angle data value immediately before the point of time from each of attitude angle data value immediately after the point of time. Moreover, the attitude angle change rate deriving section 43 divides a subtraction result by a time difference between a point of time immediately before the point of time, and a point of time immediately after the point of time. Thus, the attitude angle change rate deriving section 43 derives a time rate change, in other words an angular velocity, of each of the attitude angles at the point of time.

When the attitude angle data exists at the point of time, the attitude angle change rate deriving section 43, at the time of reading the attitude angle data, reads out also including the attitude angle data. Whereas, when the attitude angle data at the point of time does not exist, the attitude angle change rate deriving section 43 calculates an average value of the attitude angle data immediately before and immediately after the point of time, and lets the average value to be the attitude angle at the point of time.

The attitude angle change rate deriving section 43 sends the attitude angle derived as described above, and the time rate of change of each of the attitude angle, to the translation rotation acceleration estimating section 45A. Step S24 and step S25 may be executed at the same time.

Next, at step S26A, the translation rotation acceleration estimating section 45A estimates the translation contributing acceleration and the rotation contributing acceleration based on the high-frequency acceleration component and the low-frequency acceleration component from the acceleration frequency separating section 42, and the attitude angle and the time rate of change of the attitude angle from the attitude angle change rate deriving section 43. At the time of estimating, as shown in FIG. 7, at step S31, the high-frequency component estimating section 51 of the translation rotation acceleration estimating section 45A estimates that all the high-frequency acceleration components are translation contributing acceleration.

Next, at step S32, the low-frequency component estimating section 52 of the translation rotation acceleration estimating section 45A, after subtracting the gravitation acceleration from the low-frequency acceleration component based on the attitude angle received from the attitude angle change rate deriving section 43, makes a judgment of whether or not at least one of the time rate of change of the attitude angle received from the attitude angle change rate deriving section 43 is not less than a predetermined value. When the judgment result is affirmative, the process is advanced to step S33. At step S33, the low-frequency component estimating section 52 estimates that all the resultants obtained upon subtracting the gravitational acceleration from the low-frequency acceleration component are rotation contributing acceleration.

On the other hand, when the judgment result at step S32 is negative, the process is advanced to step S34. At step S34, the low-frequency component estimating section 52 estimates that all resultants obtained upon subtracting the gravitational acceleration from the low-frequency acceleration component are translation contributing acceleration. Further, the translation rotation acceleration estimating section 45A adds the high-frequency acceleration component and the resultant obtained upon subtracting the gravitational acceleration from the low-frequency acceleration component, and estimates that the result of addition is the translation contributing acceleration, as well as estimates that the rotation contributing acceleration is 0.

Thus, when the translation contributing acceleration and the rotation contributing acceleration are estimated, the translation rotation acceleration estimating section 45A stores the estimated translation contributing acceleration, the rotation contributing acceleration, and the attitude angle, as a set of data for notification, in the temporary storage area 24. Thus, when step S26A is completed, as shown in FIG. 6, the process moves to step S21. In this embodiment onward, the measured data processing computer program 35A repeats steps from step S21 to step S26A until a request for stopping the measured data processing is received from the application 33.

Returning to FIG. 5, at a desired point of time in the measured data processing of step S11A, the application 33 sends a data request in which an application identifier is let to be a parameter, to the measured data processing computer program 35A. In the measured data processing computer program 35A, the measured data processing control section 49 receives the data request, then analyzes a command from the application 33, and identifies the command as the data request from the application 33. Further, the measured data processing control section 49 gives to the data notifying section 46, a command for notifying data for notification to the application 33. The data notifying section 46 which has received the command performs a data notification process of step $S12_1$.

At step $S12_1$, first of all, the data notifying section 46 reads out the data for notification from the temporary storage area 24. Next, the data notifying section 46 notifies the data for notification which is read out, to the application 33. Thus, the process at step S12 is completed.

Thus, by the processing of the measured data, the application 33 can acquire estimate values of the latest translation contributing acceleration, the rotation contributing acceleration, and the attitude angle at a point of time corresponding to these estimate values, by issuing the data request at the desired point of time.

Note that the measured data process at step S11A can be executed at the same time when the data notification process of step $S12_1$ is executed, and can also be executed continuously after the completion of execution of the data notification process $S12_1$. Therefore, the application 33 can acquire the estimate values of the latest translation contributing acceleration, the rotation contributing acceleration, and the attitude angle at the point of time corresponding to these estimate values, by issuing the data request for any number of times at the desired point of time (in FIG. 5, an example in a case of issuing twice is shown).

Moreover, the measured data processing at step S11A is completed by issuing a data collection stop request, at a desired time, by the application 33. Furthermore, when the application 33 issues the data collection stop request, the measured data processing computer program 35A (more particularly, the measured data processing control section 49) which has received the data collection stop request, sends a sensor operation stop command to the sensor unit 25. As a result of this, the operation of the sensor unit 25 is stopped.

As it is described above, in the first embodiment, the data collecting section 41 collects the measurement result of the attitude angle and the measurement result of acceleration in a direction along each of an X-axis and a Y-axis from among the X-axis, the Y-axis, and the Z-axis which are mutually orthogonal, and are defined peculiarly in the cellular phone 10. Next, the acceleration frequency separating section 42 separates the low-frequency acceleration component and the high-frequency acceleration component in each of the measurement result of acceleration. Moreover, the attitude angle change rate deriving section 43 derives the time rate of change of the attitude angle. Furthermore, the translation rotation acceleration estimating section 45A estimates the translation contributing acceleration and the rotation contributing acceleration based on the high-frequency acceleration component, the low-frequency acceleration component, the attitude angle, and the time rate of change of the attitude angle.

In this embodiment, the high-frequency component estimating section 51 in the translation rotation acceleration estimating section 45A estimates that the high-frequency acceleration component does not include the component of the rotation contributing acceleration, and includes only the component of the translation contributing acceleration. Moreover, the low-frequency component estimating section 52 in the translation rotation acceleration estimating section 45A makes a judgment of whether or not the absolute value of the time rate of change of the attitude angle is not less than the predetermined value. When the judgment is negative, the low-frequency component estimating section 52 estimates that the resultant obtained upon subtracting the gravitational acceleration from the low-frequency acceleration component does not include the component of the rotation contributing acceleration, and includes only the component of the translation contributing acceleration. On the other hand, when the judgment is affirmative, the low-frequency component estimating section 52 estimates that the resultant obtained upon subtracting the gravitational acceleration from the low-frequency acceleration component does not include the component of the translation contributing acceleration, and includes only the component of the rotation contributing acceleration.

Consequently, it is possible to estimate with improved accuracy the translation contributing acceleration which contributes to the translational movement and the rotation contributing acceleration which contributes to the rotational movement of the cellular phone 10 which is a moving object.

<Second Embodiment>

A second embodiment of the present invention will be described below. Note that in the description of the second embodiment, for components which are same as or similar to the components in the first embodiment described above, the same reference numerals are used, and repeated description is omitted.

A cellular phone 10 of the second embodiment differs from the cellular phone 10 in the first embodiment, at a point that the cellular phone 10 in the second embodiment includes a measured data processing computer program 35B instead of the measured data processing computer program 35A. The cellular phone 10 in the second embodiment will be described below by focusing mainly at the point of difference.

Figure 8:
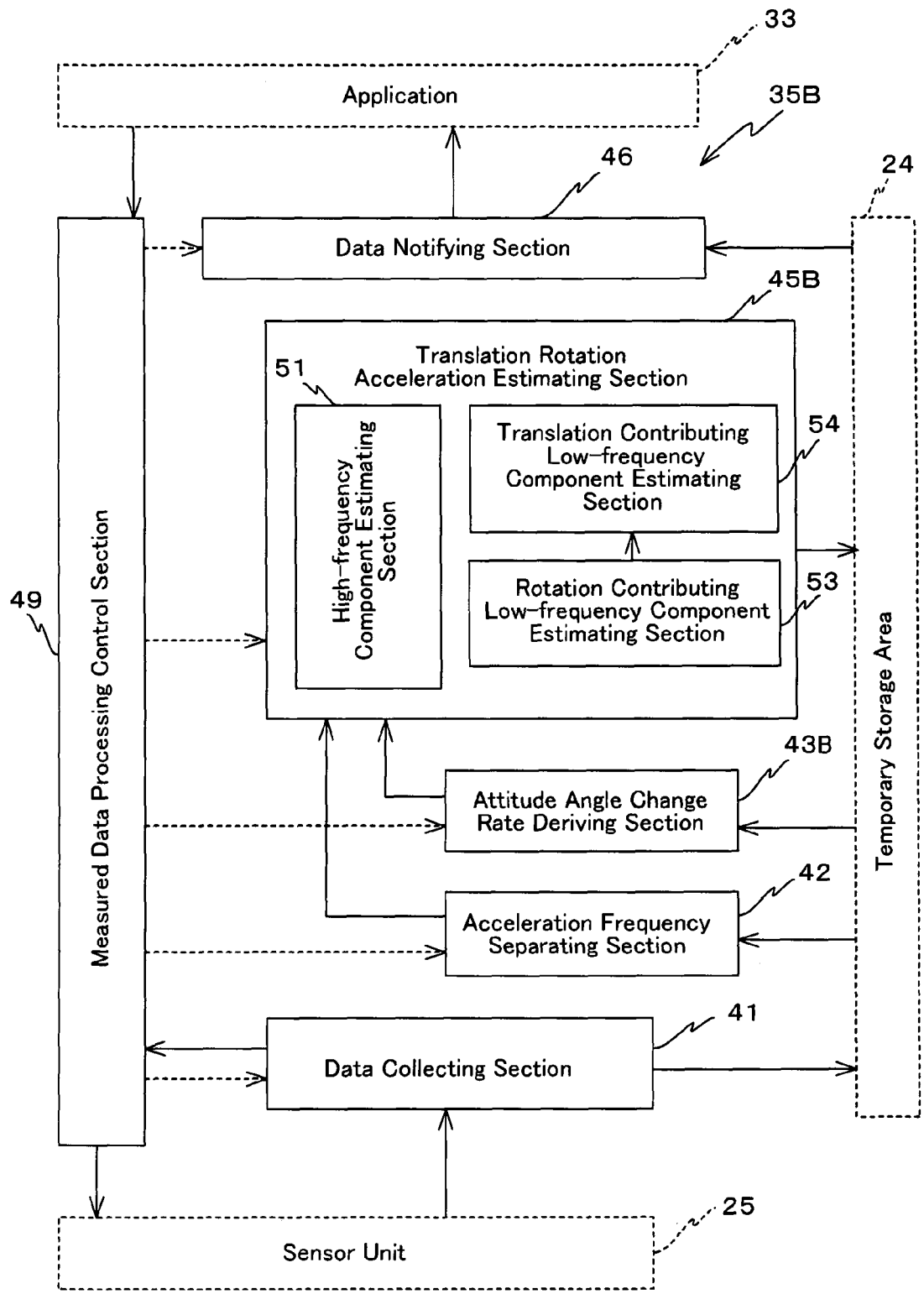
FIG. 8 is a functional block diagram for describing a configuration of a measured data processing computer program in a second embodiment.

The measured data processing computer program 35B, as shown in FIG. 8, differs from the measured data processing computer program 35A of the first embodiment only at points that the measured data processing computer program 35B includes an attitude angle change rate deriving section 43B which calculates the low-frequency component of the time rate of change of the attitude angle, instead of the attitude angle change rate deriving section 43, and includes a translation rotation acceleration estimating section 45B instead of the translation rotation acceleration estimating section 45A. The translation rotation acceleration estimating section 45B differs from the translation rotation acceleration estimating section 45A only at points that the translation rotation acceleration estimating section 45B includes instead of the low-frequency component estimating section 52, a rotation contributing low-frequency component estimating section 53 which estimates a rotation contributing low-frequency acceleration component based on a low-frequency attitude angle time rate of change component, and a translation contributing low-frequency component estimating section 54 which estimates a rotation contributing low-frequency acceleration component based on the low-frequency acceleration component, the attitude angle, and the rotation contributing low-frequency acceleration component.

Figure 9:
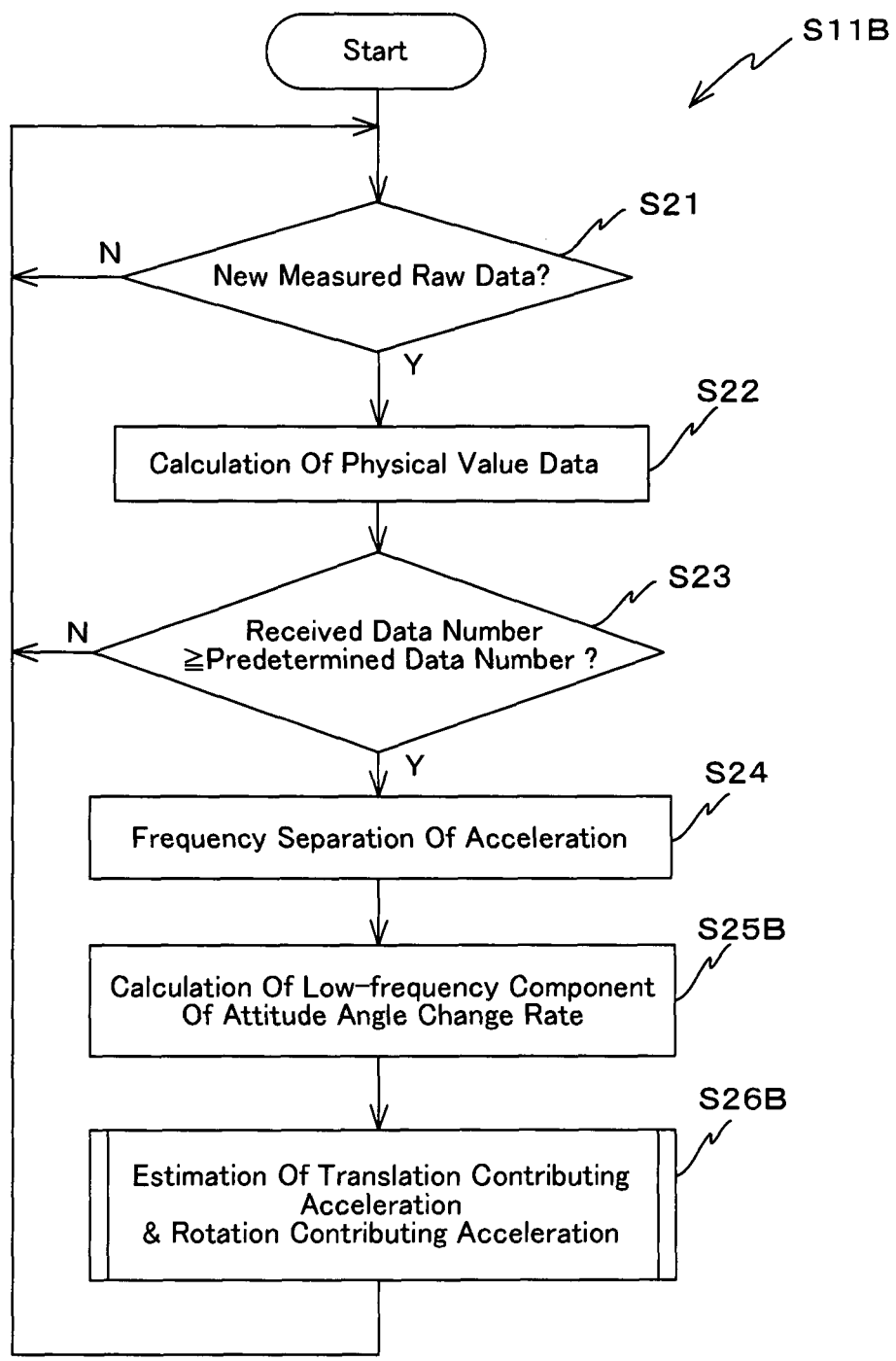
FIG. 9 is a flowchart for describing a process at a measured data processing step in the second embodiment.

The cellular phone 10 of the second embodiment, which is structured in such manner, differs at a point that instead of the measured data processing at step S11A in the case of the first embodiment, a measured data processing at step S11B (refer to FIG. 9) is performed. At this step S11B, as shown in FIG. 9, first of all, similarly as in the first embodiment, at steps from step S21 to S24, the data collecting section 41 collects the measured raw data, then calculates measured physical value data, and stores in the temporary storage area 24. When more than predetermined number of sets of the measured physical value data is stored, the acceleration frequency separating section 42 separates the high-frequency acceleration component and the low-frequency acceleration component, based on accelerate data in the measured physical value data.

Next, at step S25B, the attitude angle change rate deriving section 43B which has received a command from the measured data processing control section 49, based on attitude angle data in the measured physical value data, derives a low-frequency component of the time rate of change of each of the attitude angles at a point of time at which the low-frequency acceleration component is calculated. At the time of deriving the time rate of change of each of the attitude angles, the attitude angle change rate deriving section 43B reads out the attitude angle data from the temporary storage area 24. Next, the attitude angle change rate deriving section 43B calculates the rate of change of the attitude angle at each point of time at which the acceleration data used for the calculation of the low-frequency acceleration component described above is acquired, similarly as in the case of calculation of the rate of change of the attitude angle in the first embodiment described above.

Further, the attitude angle change rate deriving section 43B calculates an average of the time rate of change of the attitude angle which is calculated. Accordingly, the low-frequency component of the time rate of change of each of the attitude angles at the point of time at which the low-frequency acceleration component is calculated is derived.

Note that The attitude angle change rate deriving section 43B similar to the attitude angle change rate deriving section 43 in the case of the first embodiment, at the time of reading out the attitude angle data, if the attitude angle data at that point of time exists, reads out together that attitude angle data. On the other hand, when the attitude angle data at that point of time does not exist, the attitude angle change rate deriving section 43B calculates an average value of the attitude angle data immediately before and immediately after the point of time.

The attitude angle change rate deriving section 43B sends the attitude angle derived as described above, and the low-frequency component of the time rate of change of each of the attitude angle, to the translation rotation acceleration estimating section 45B. Note that step S24 and step S25 may be executed at the same time.

Figure 10:
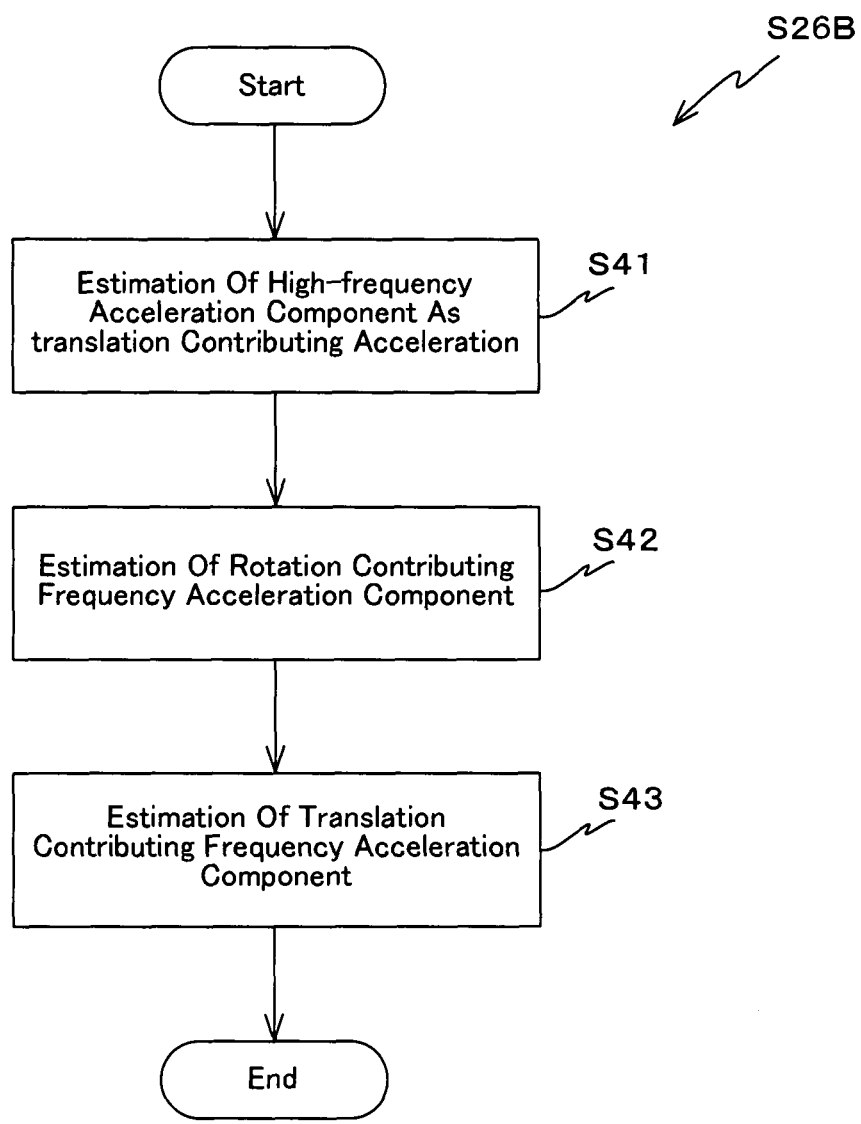
FIG. 10 is a flowchart for describing a process at a step of estimating the translation contributing acceleration and the rotation contributing acceleration in FIG. 9.

Next, at step S26B, the translation rotation acceleration estimating section 45B estimates the translation contributing acceleration and the rotation contributing acceleration based on the high-frequency acceleration component and the low-frequency acceleration component from the acceleration frequency separating section 42, and the low-frequency component of the time rate of change of the attitude angle, and the attitude angle from the attitude angle change rate deriving section 43B. At the time of estimating, as shown in FIG. 10, at step S41, the high-frequency component estimating section 51 of the translation rotation acceleration estimating section 45B, similarly as in the case of the first embodiment, estimates that all the high-frequency acceleration components are translation contributing components.

Next, at step S42, the rotation contributing low-frequency component estimating section 53 of the translation rotation acceleration estimating section 45B estimates the rotation contributing low-frequency acceleration which is a low-frequency component of the acceleration contributing to the rotational movement, based on the low-frequency component of the rate of change of the attitude angle received from the attitude angle change rate deriving section 43, and a barycentric position and moment of inertia of the cellular phone 10, which are known in advance. Next, the translation contributing low-frequency acceleration estimating section 54 of the translation rotation acceleration estimating section 45B, at step S43, after subtracting a gravitational acceleration component from the low-frequency acceleration component based on the attitude angle received from the attitude angle change rate deriving section 43B, further subtracts the rotation contributing low-frequency acceleration component which is received from the rotation contributing low-frequency acceleration estimating section 53. The translation contributing low-frequency acceleration estimating section 54 estimates that the resultant which is calculated in such manner is the translation contributing low-frequency acceleration component which is a low-frequency component of the acceleration which contributes to the translational movement.

Next, the translation rotation acceleration estimating section 45B adds the high-frequency acceleration component and the translation contributing low-frequency acceleration component, and estimates the result of addition as the translation contributing acceleration. Moreover, the translation rotation acceleration estimating section 45B estimates the rotation contributing low-frequency acceleration component to be the rotation contributing acceleration. Thus, when the translation contributing acceleration and the rotation contributing acceleration are estimated, the translation rotation acceleration estimating section 45B stores the estimated translation contributing acceleration, rotation contributing acceleration, and the attitude angle as a set of data for notification, in the temporary storage area 24. When step S26B is completed, as shown in FIG. 9, the process is moved to step S21. In this embodiment onward, the measured data processing computer program 35B repeats steps from step S21 to S26B until a request for stopping the measured data processing is received from the application 33.

At a desired point of time in the measured data processing at step S11B, when the application 33 issues a data request in which an application identifier is let to be a parameter, similarly as in the case of the first embodiment, in the measured data processing computer program 35B, the measured data processing control section 49 receives the data request, then analyzes a command from the application 33, and identifies the command to be a data request from the application 33. Further, the measured data processing control section 49 gives a notification command of data for notification to the application 33, to the data notifying section 46. The data notifying section 46 which has received this command performs a data notification process at step S12$_j$ (j=1, 2 . . . ).

Thus, by the processing of the measured data, the application 33 can acquire estimate values of the latest translation contributing acceleration, the rotation contributing acceleration, and the attitude angle at a point of time corresponding to these estimate values, by issuing the data request at the desired point of time.

Moreover, even in the second embodiment, similarly as in the case of the first embodiment, the measured data processing at step S11B is completed by issuing the data collection stop request at a desired time by the application 33. Furthermore, when the application 33 issues a sensor operation stop request, the measured data processing computer program 35B (more particularly, the measured data processing control section 49) which has received the sensor operation stop request, sends the sensor operation stop command to the sensor unit 25. As a result of this, the operation of the sensor unit 25 is stopped.

As described above, in the second embodiment, the data collecting section 41 collects the measurement result of the attitude angle and the measurement result of acceleration in the direction along each of the X-axis and the Y-axis from among the X-axis, the Y-axis, and the Z-axis which are mutually orthogonal and are defined in the cellular phone 10. Next, the acceleration frequency separating section 42 separates the low-frequency acceleration component and the high-frequency acceleration component in each of the measurement results of acceleration. Moreover, the attitude angle change rate deriving section 43B derives the low-frequency component of the time rate of change of the attitude angle. Furthermore, the translation rotation acceleration estimating section 45B estimates the translation contributing acceleration and the rotation contributing acceleration based on the high-frequency acceleration component, the low-frequency acceleration component, the attitude angle, and the low-frequency component of the time rate of change of the attitude angle.

In this embodiment, the high-frequency component estimating section 51 in the translation rotation acceleration estimating section 45B estimates that the high-frequency acceleration component does not include the component of the rotation contributing acceleration, and includes only the component of the translation contributing acceleration. Moreover, the rotation contributing low-frequency component estimating section 53 in the translation rotation acceleration estimating section 45B estimates the rotation contributing low-frequency acceleration component, and the translation contributing low-frequency component estimating section 54 in the translation rotation acceleration estimating section 45B estimates the translation contributing low-frequency acceleration component.

Consequently, it is possible to estimate with accuracy the translation contributing acceleration which contributes to the translational movement and the rotation contributing acceleration which contributes to the rotational movement of the cellular phone 10.

<Third Embodiment>

A third embodiment of the present invention will be described below. Note that in the description of the third embodiment, for components which are same as or similar to the components in the first embodiment or the second embodiment described above, the same reference numerals are used, and repeated description is omitted.

A cellular phone 10 of the third embodiment differs from the cellular phone 10 of the second embodiment, at a point that the cellular phone 10 in the third embodiment includes a measured data processing computer program 35C instead of the measured data processing computer program 35B. The cellular phone 10 in the third embodiment will be described below by focusing mainly at the point of difference.

Figure 11:
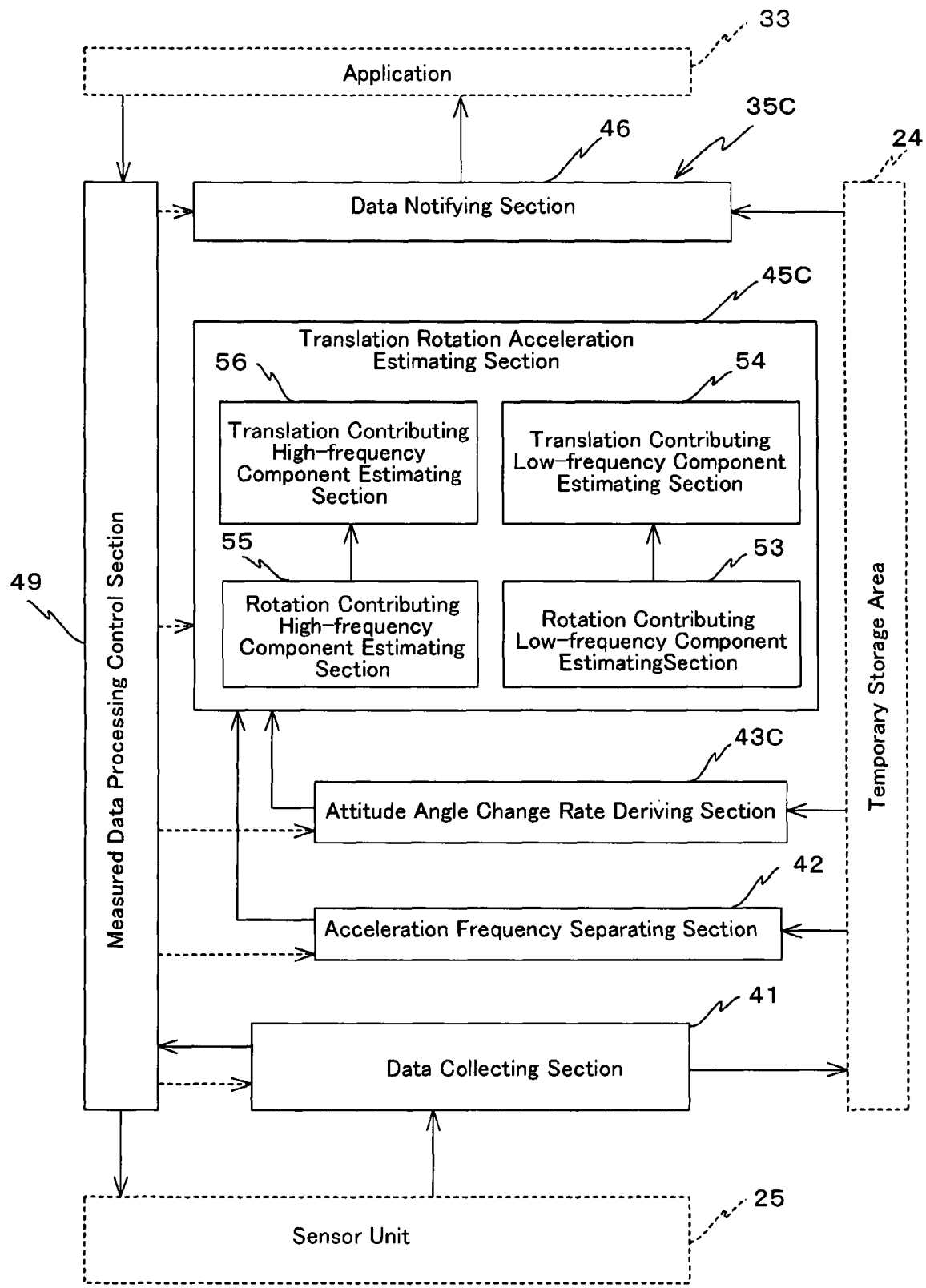
FIG. 11 is a functional block diagram for describing a configuration of a measured data processing computer program in a third embodiment.

The measured data processing computer program 35C, as shown in FIG. 11, differs from the measured data processing computer program 35B of the second embodiment at points that the measured data processing computer program 35C includes an attitude angle change rate deriving section 43C which derives the low-frequency component of the time rate of change of the attitude angle, instead of the attitude angle change rate deriving section 43B, and includes a translation rotation acceleration estimating section 45C instead of the translation rotation acceleration estimating section 45B. The translation rotation acceleration estimating section 45C differs from the translation rotation acceleration estimating section 45B only at points that the translation rotation acceleration estimating section 45C includes instead of the high-frequency component estimating section 51, a rotation contributing high-frequency component estimating section 55 which estimates the rotation contributing high-frequency acceleration component based on the high-frequency attitude angle time rate of change component, and a translation contributing high-frequency component estimating section 56 which estimates the translation contributing high-frequency acceleration component based on the high-frequency acceleration component and the rotation contributing high-frequency acceleration component.

Figure 12:
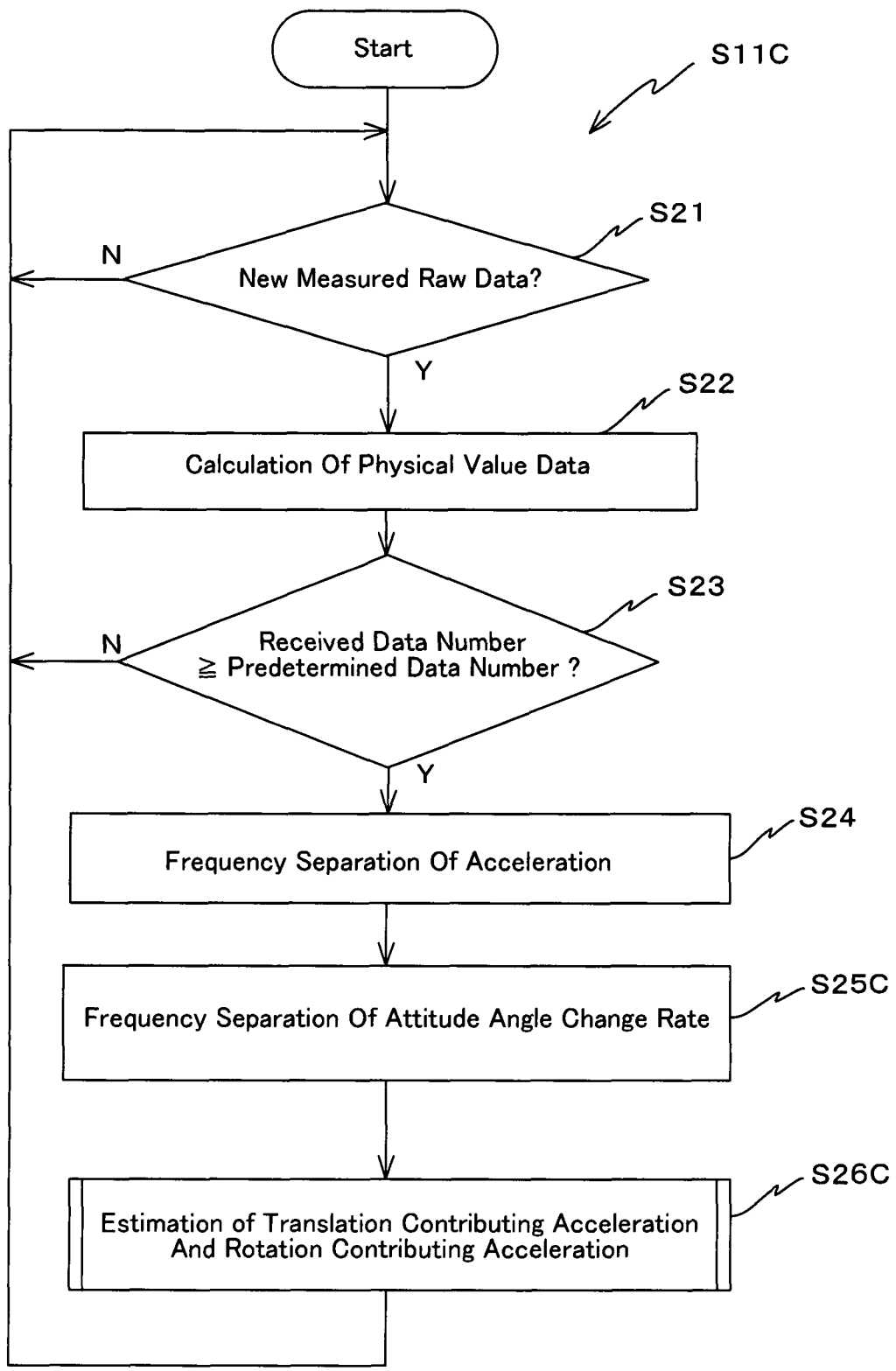
FIG. 12 is a flowchart for describing a process at a measured data processing step in the third embodiment.

The cellular phone 10 of the third embodiment, which is structured in such manner, differs from the case in the second embodiment at a point that instead of the measured data processing at step S11B in the case of the second embodiment, a measured data processing at step S11C (refer to FIG. 12) is performed. At this step S11C, as shown in FIG. 12, first of all, similarly as in the second embodiment, at steps from step S21 to S24, the data collecting section 41 collects the measured raw data, then calculates measured physical value data and stores it in the temporary storage area 24. When more than predetermined number of sets of the measured physical value data is stored, the acceleration frequency separating section 42 separates the high-frequency acceleration component and the low-frequency acceleration component based on acceleration data in the measured physical value data.

Next, at step S25C, the attitude angle change rate deriving section 43C which has received a command from the measured data processing control section 49, based on the attitude angle data in the measured physical value data, separates the high-frequency component and the low-frequency component of the time rate of change of each of the attitude angles at a point of time when the low-frequency acceleration component described above is calculated. At the time of separating the high-frequency component and the low-frequency component of the time rate of change of each of the attitude angles, first of all, the attitude angle change rate deriving section 43C reads out the attitude angle data from the temporary storage area 24. Next, the attitude angle change rate deriving section 43C, calculates the rate of change of the attitude angle at each point of time at which the acceleration data which is used for the calculation of the low-frequency acceleration component, is acquired, similarly as in the case of the second embodiment.

Next, the attitude angle change rate deriving section 43C calculates an average of the time rate of change of the attitude angle which is calculated. Accordingly, the low-frequency component of the time rate of change of each of the attitude angles at the point of time at which the low-frequency acceleration component is calculated is derived. Further, the attitude angle change rate deriving section 43C subtracts the low-frequency component of the time rate of change of the attitude angle from the rate of change of the attitude angle at the point of time at which the low-frequency acceleration component is calculated. Accordingly, the high-frequency component of the time rate of change of each of the attitude angles at the point of time at which the low-frequency acceleration component is calculated is derived.

Note that the attitude angle change rate deriving section 43C, similarly as the attitude angle change rate deriving section 43 in a case of the first embodiment, at the time of reading out the attitude angle data, if the attitude angle data at that point of time exists, reads out together that attitude angle data. On the other hand, when the attitude angle data does not exist, the attitude angle change rate deriving section 43C calculates the average value of the attitude angle data immediately before and immediately after the point of time.

The attitude angle change rate deriving section 43C sends the high-frequency component and the low-frequency component of the time rate of change of each of the attitude angles, and the attitude angle derived as described above, to the translation rotation acceleration estimating section 45C. Note that step S24 and step S25 may be executed at the same time.

Figure 13:
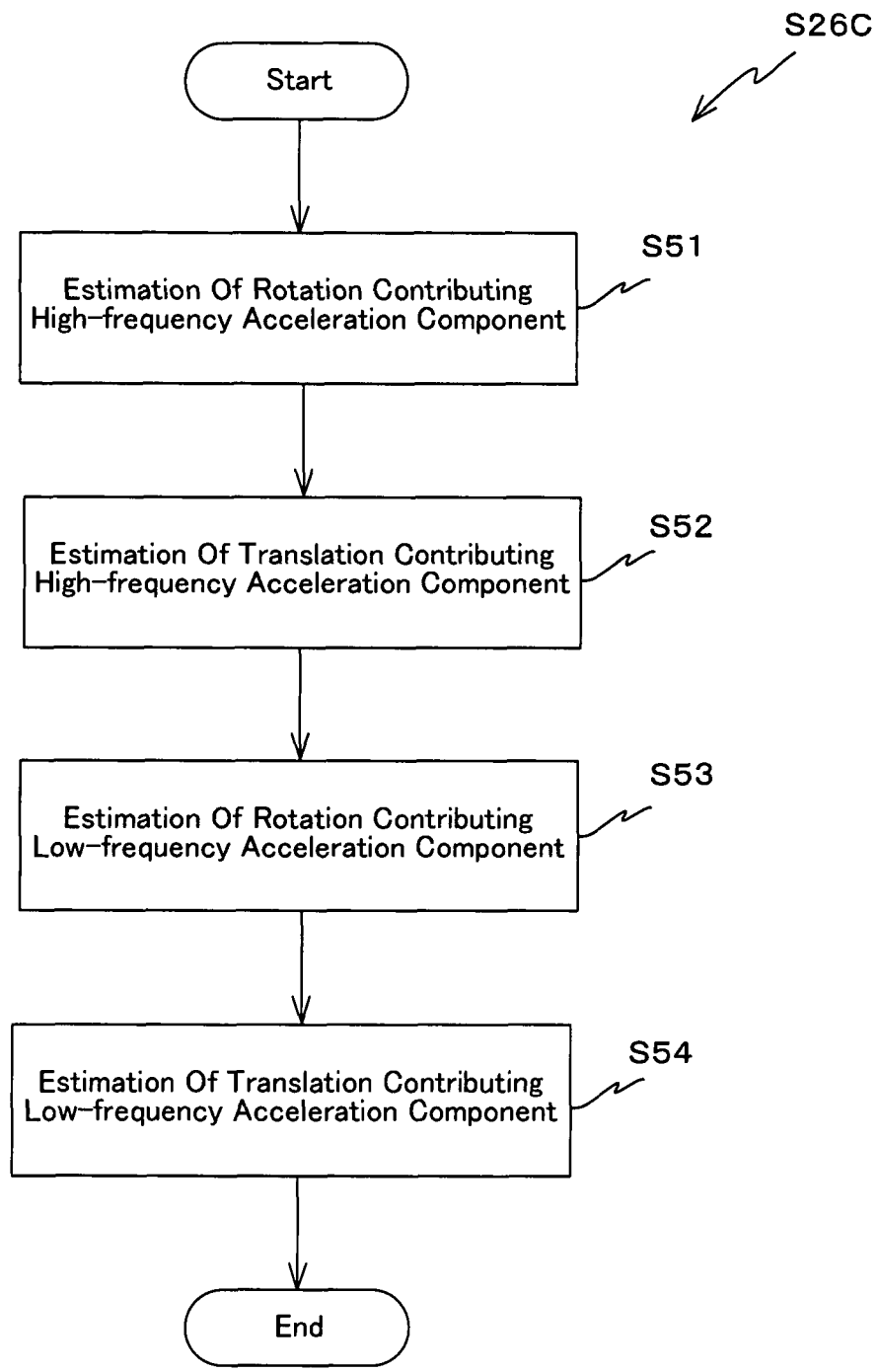
FIG. 13 is a flowchart for describing a process at a step of estimating the translation contributing acceleration and the rotation contributing acceleration in FIG. 12.

Next, at step S26C, the translation rotation acceleration estimating section 45C estimates the translation contributing acceleration and the rotation contributing acceleration based on the high-frequency acceleration component and the low-frequency acceleration component from the acceleration frequency separating section 42, and the high-frequency component and the low-frequency component of the time rate of change of the attitude angle, and the attitude angle from the attitude angle change rate deriving section 43C. At the time of estimating, as shown in FIG. 13, at step S51, the rotation contributing frequency component estimating section 55 of the translation rotation acceleration estimating section 45C estimates the rotation contributing high-frequency acceleration component which is a high-frequency component of the acceleration contributing the rotational movement, based on the high-frequency component of the rate of change of the attitude angle received from the attitude angle change rate deriving section 43c, and the barycentric position and the moment of inertia of the cellular phone 10 which are known in advance.

Next, the translation contributing high-frequency component estimating section 56 of the translation rotation acceleration estimating section 45C, at step S52, subtracts the rotation contributing high-frequency acceleration component which is received from the rotation contributing high-frequency component estimating section 55, from the high-frequency acceleration component which is received from the attitude angle change rate deriving section 43C. The translation contributing high-frequency component estimating section 56 estimates that the resultant calculated in such manner is the translation contributing high-frequency acceleration component which is the high-frequency component of the acceleration which contributes to the translational movement.

Next, at step S53, the rotation contributing low-frequency component estimating section 53 of the translation rotation acceleration estimating section 45C, similarly as in the case of the second embodiment, estimates the rotation contributing low-frequency acceleration component which is the low-frequency component of the acceleration which contributes to the rotational movement. Next, at step S54, the translation contributing low-frequency component estimating section 54 of the translation rotation acceleration estimating section 45C, similarly as in the case in the second embodiment, estimates the translation contributing low-frequency acceleration component which is the low-frequency component of acceleration which contributes to the translational movement.

Further, the translation rotation acceleration estimating section 45C calculates the rotation contributing high-frequency acceleration component and the rotation contributing low-frequency acceleration component, and estimates the result of the calculation to be the rotation contributing acceleration. Moreover, the translation rotation acceleration estimating section 45C adds the translation contributing high-frequency acceleration component and the translation contributing low-frequency acceleration component, and estimates the result of the addition to be the translation contributing acceleration. Thus, when the translation contributing acceleration and the rotation contributing acceleration are estimated, the translation rotation acceleration estimating section 45C stores in the temporary storage area 24, the estimated translation contributing acceleration and the rotation contributing acceleration, and the attitude angle as a set of data for notification. Thus, when the step S26C is completed, the process is moved to step S21 as shown in FIG. 12. In this embodiment onward, the measured data processing computer program 35C repeats steps from step S21 to step S26 until a request for stopping the measured data processing is received from the application 33.

At a desired point of time in the measured data processing at step S11C, when the application 33 issues the data request in which an application identifier is let to be a parameter, similarly as in the first embodiment and the second embodiment, in the measured data processing computer program 35C, the measured data processing control section 49 receives the data request, then analyzes a command from the application 33, and identifies it to be a data request from the application 33. Further, the measured data processing control section 49 gives a notification command of data for notification to the application 33 to the data notifying section 46. The data notifying section 46 which has received this command performs a data notification process at step $S12_j$ (j=1, 2 . . . ) (refer to FIG. 5).

Thus, by the processing of the measured data, the application 33 can acquire estimate values of the latest translation contributing acceleration, the rotation contributing acceleration, and the attitude angle at a point of time corresponding to these estimate values, by issuing the data request at the desired point of time.

Moreover, even in the third embodiment, similarly as in the first embodiment and the second embodiment, the measured data processing at step S11C is completed by issuing of the data collection stop request at a desired time by the application 33. Furthermore, when the application 33 issues the sensor operation stop request, the measured data processing computer program 35C (more particularly, the measured data processing control section 49) which has received the sensor operation stop request, sends the sensor operation stop request to the sensor unit 25. As a result of this, the operation of the sensor unit 25 is stopped.

As described above, in the third embodiment, the data collecting section 41 collects the measurement result of the attitude angle and the measurement result of acceleration in the direction along each of the X-axis and the Y-axis from among the X-axis, the Y-axis, and the Z-axis which are mutually orthogonal and defined in the cellular phone 10. Next, the acceleration frequency separating section 42 separates the low-frequency acceleration component and the high-frequency acceleration component in each of the measurement result of acceleration. Moreover, the attitude angle change rate deriving section 43C separates the low-frequency acceleration component and the high-frequency acceleration component of the time rate of change of the attitude angle. Furthermore, the translation rotation acceleration estimating section 45C estimates the translation contributing acceleration and the rotation contributing acceleration based on the high-frequency acceleration component, the low-frequency acceleration component, the attitude angle, and the high-frequency component and the low-frequency component of the time rate of change of the attitude angle.

In this embodiment, the rotation contributing high-frequency component estimating section 55 in the translation rotation acceleration estimating section 45C estimates the rotation contributing high-frequency acceleration component, and the translation contributing high-frequency component estimating section 56 in the translation rotation acceleration estimating section 45C estimates the translation contributing high-frequency acceleration component. Moreover, the rotation contributing low-frequency component estimating section 53 in the translation rotation acceleration estimating section 45C estimates the rotation contributing low-frequency acceleration component, and the translation contributing low-frequency component estimating section 54 in the translation rotation acceleration estimating section 45C estimates the translation contributing low-frequency acceleration component.

Consequently, it is possible to estimate with accuracy, the translation contributing acceleration which contributes to the translational movement, and the rotation contributing acceleration which contributes to the rotational movement of the cellular phone 10.

<Fourth Embodiment>

A fourth embodiment of the present invention will be described below. In the description of the fourth embodiment, for components which are same as or similar to the components in the first embodiment, the same reference numerals are used, and repeated description is omitted.

A cellular phone 10 of the fourth embodiment differs from the cellular phone 10 of the first embodiment at a point that the cellular phone 10 in the fourth embodiment includes a measured data processing computer program 35D instead of the measured data processing computer program 35A. The cellular phone 10 in the fourth embodiment will be described below by focusing mainly at the point of difference.

Figure 14:
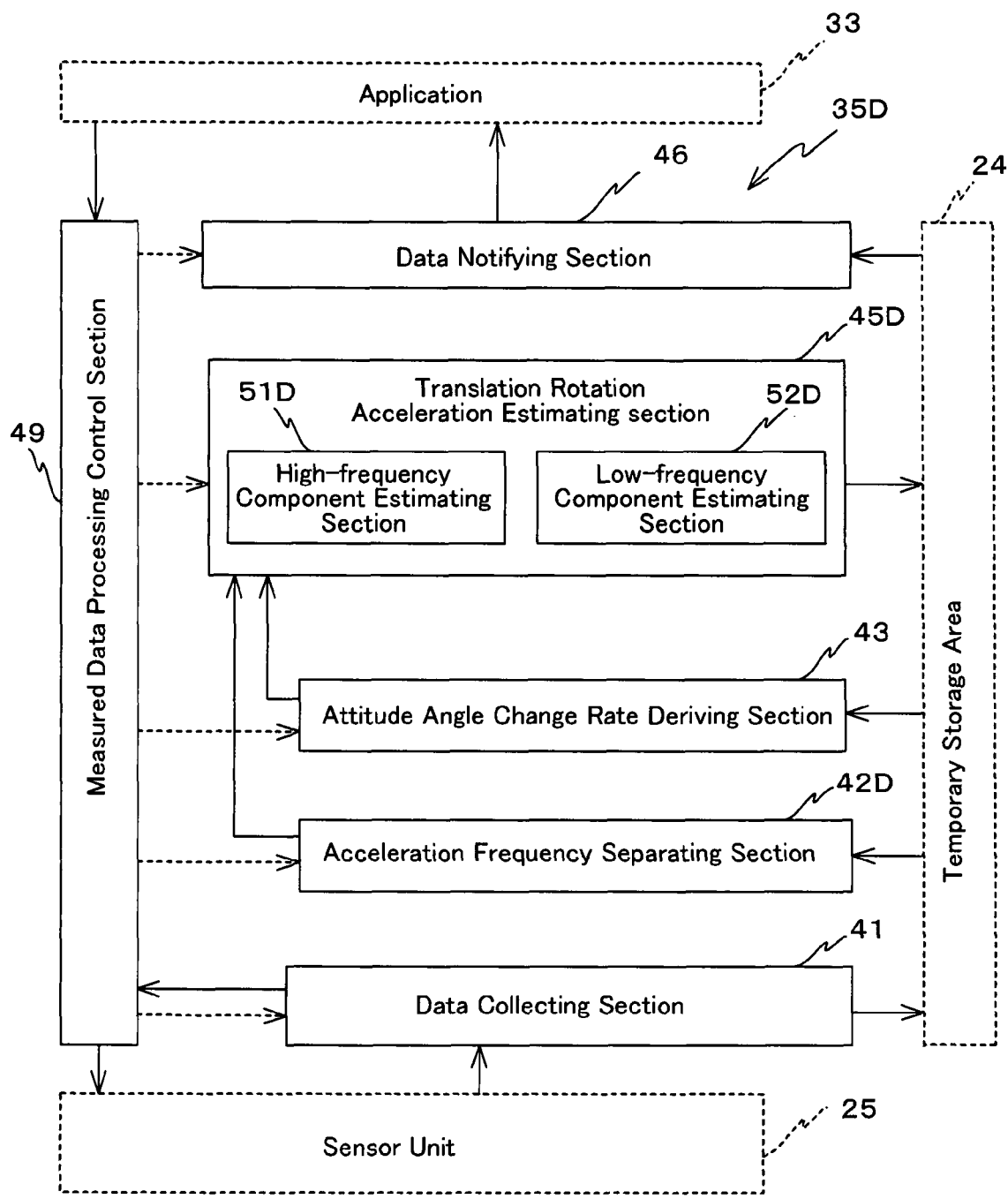
FIG. 14 is a functional block diagram for describing a configuration of a measured data processing computer program in a fourth embodiment.

The measured data processing computer program 35D, as shown in FIG. 14, differs from the measured data processing computer program 35A of the first embodiment at points that the measured data processing computer program 35D includes an acceleration frequency separating section 42D instead of the acceleration frequency separating section 42, and includes a translation rotation acceleration estimating section 45D instead of the translation rotation acceleration estimating section 45A.

The acceleration frequency separating section 42D reads out a predetermined number (20 data for example) of the latest data, and finds the low-frequency acceleration component which can be evaluated as a direct current component, by calculating the moving average deviation. Further, the acceleration frequency separating section 42D finds the high-frequency acceleration component by subtracting the low-frequency acceleration component from the acceleration data at a point of time at which an estimation of including the calculated low-frequency acceleration component is made.

The translation rotation acceleration estimating section 45D includes a high-frequency component estimating section 51D and a low-frequency component estimating section 52D. In this embodiment, the low-frequency component estimating section 52D estimates that only a component of the gravitation acceleration is included in the low-frequency acceleration component. This is because, in a case of a manual operation of the cellular phone 10, it is considered to be normal that both the translation acceleration and the rotation acceleration change constantly, although the change is small, and it is considered that the acceleration component which can be evaluated as the direct current component is derived from the gravitational force which acts on the cellular phone in a stationary state.

Moreover, when the time rate of change of the attitude angle is less than a predetermined value, the high-frequency component estimating section 51D estimates that the high-frequency acceleration component includes only the translation contributing acceleration. This is because, when the time rate of change of the attitude angle is less than the predetermined value, it is considered that a substantial translation contributing acceleration is included in the high-frequency acceleration component, and only a small amount of the rotation contributing acceleration is included in the high-frequency acceleration component.

Whereas, when the time rate of change of the attitude angle is not less than the predetermined value, the high-frequency component estimating section 51D estimates that the high-frequency acceleration component includes only the rotation contributing acceleration. This is because, when the time rate of change of the attitude angle is not less than the predetermined value, it is considered that a substantial rotation contributing acceleration is included in the high-frequency acceleration component, and only a small amount of the translation contributing acceleration is included in the high-frequency acceleration component.

Figure 15:
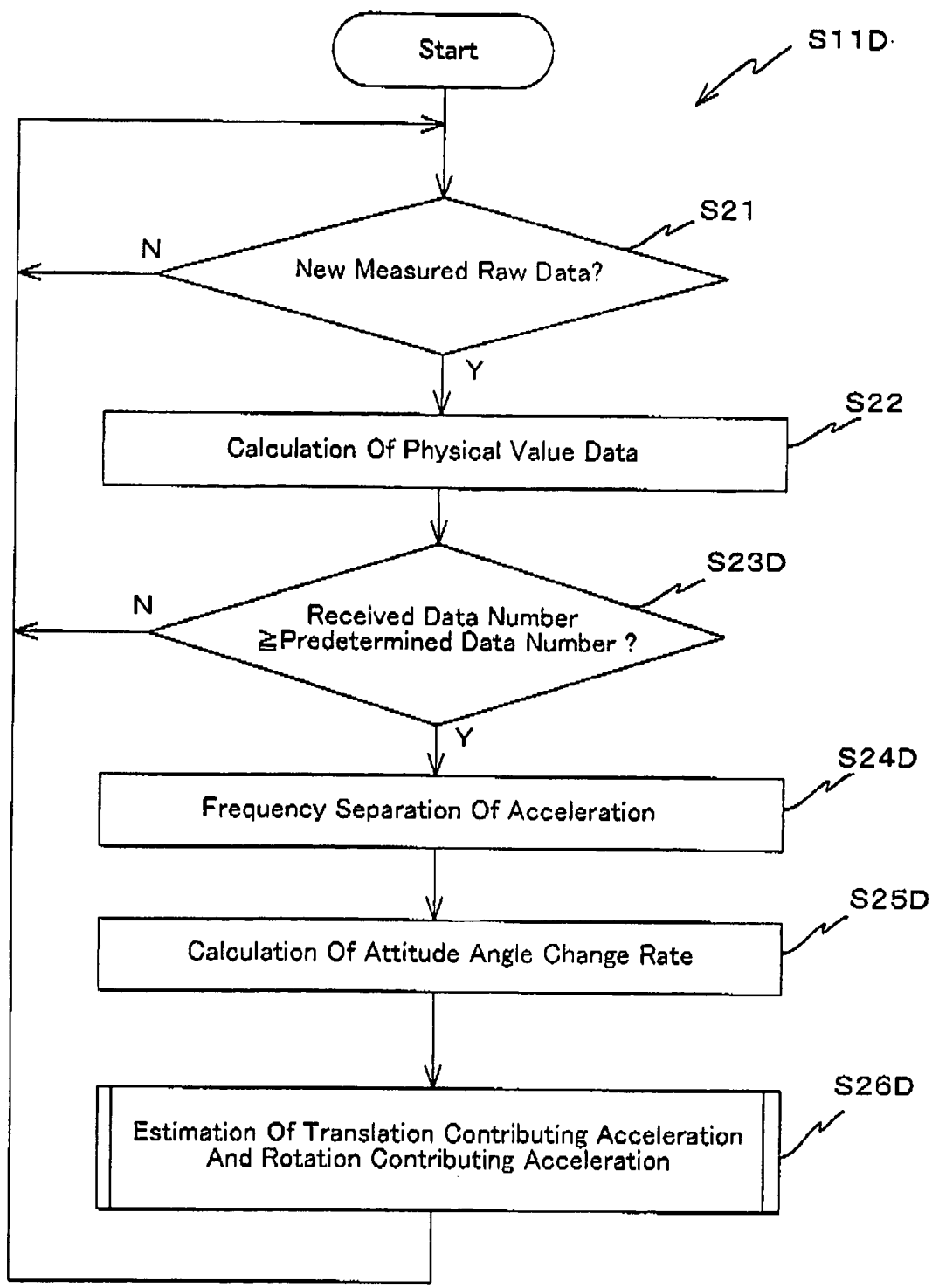
FIG. 15 is a flowchart for describing a process at a measured data processing step in the fourth embodiment.

The cellular phone 10 of the fourth embodiment, which is structured in such manner, differs at a point that instead of the measured data processing at step S11A in the case of the first embodiment, a measured data processing at step S11D (refer to FIG. 15) is performed. At this step S11D, as shown in FIG. 15, first of all, similarly as in the first embodiment, at steps from step S21 to S23D, the data collecting section 41 collects the measured raw data, then calculates the measured physical value data, and stores it in the temporary storage area 24. Accordingly, a judgment of whether or not more than a predetermined number of sets of the measured physical value data are collected is made. Note that in the fourth embodiment, the predetermined number is greater than the predetermined number in the first embodiment, and a value from which a low-frequency component of an acceleration change which can be evaluated as the direct current component described above can be extracted is adopted. This predetermined number is determined based on experience, on results of experiments and evaluation.

Next, at step S24D, the acceleration frequency separating section 42D which has received the command from the measured data processing control section 49 separates the high-frequency acceleration component and the low-frequency acceleration component based on the acceleration data in the measured physical value data. At the time of separating the high-frequency acceleration component and the low-frequency acceleration component, the acceleration frequency separating section 42D, similarly as in the case of the first embodiment, finds the low-frequency acceleration component which can be evaluated as the direct current component, by calculating the moving average deviation. Next, the acceleration frequency separating section 42D finds the high-frequency acceleration component at the point of time, by subtracting the low-frequency acceleration component from the acceleration data at a point of time at which the calculated moving average deviation is let to be the low-frequency acceleration component.

Thus, the high-frequency acceleration component and the low-frequency acceleration component in each of the X-axis direction acceleration data and the Y-axis direction acceleration data at the point of time are separated. The acceleration frequency separating section 42D sends the separated high-frequency acceleration component and the low-frequency acceleration component to the translation rotation acceleration estimating section 45D.

Next, at step S25D, similarly as in the case of the step 25A in the first embodiment, the attitude angle change rate deriving section 43, based on the attitude angle data in the measured physical value data, derives the time rate change of each of the attitude angles at a point of time at which the low-frequency acceleration component was calculated.

Figure 16:
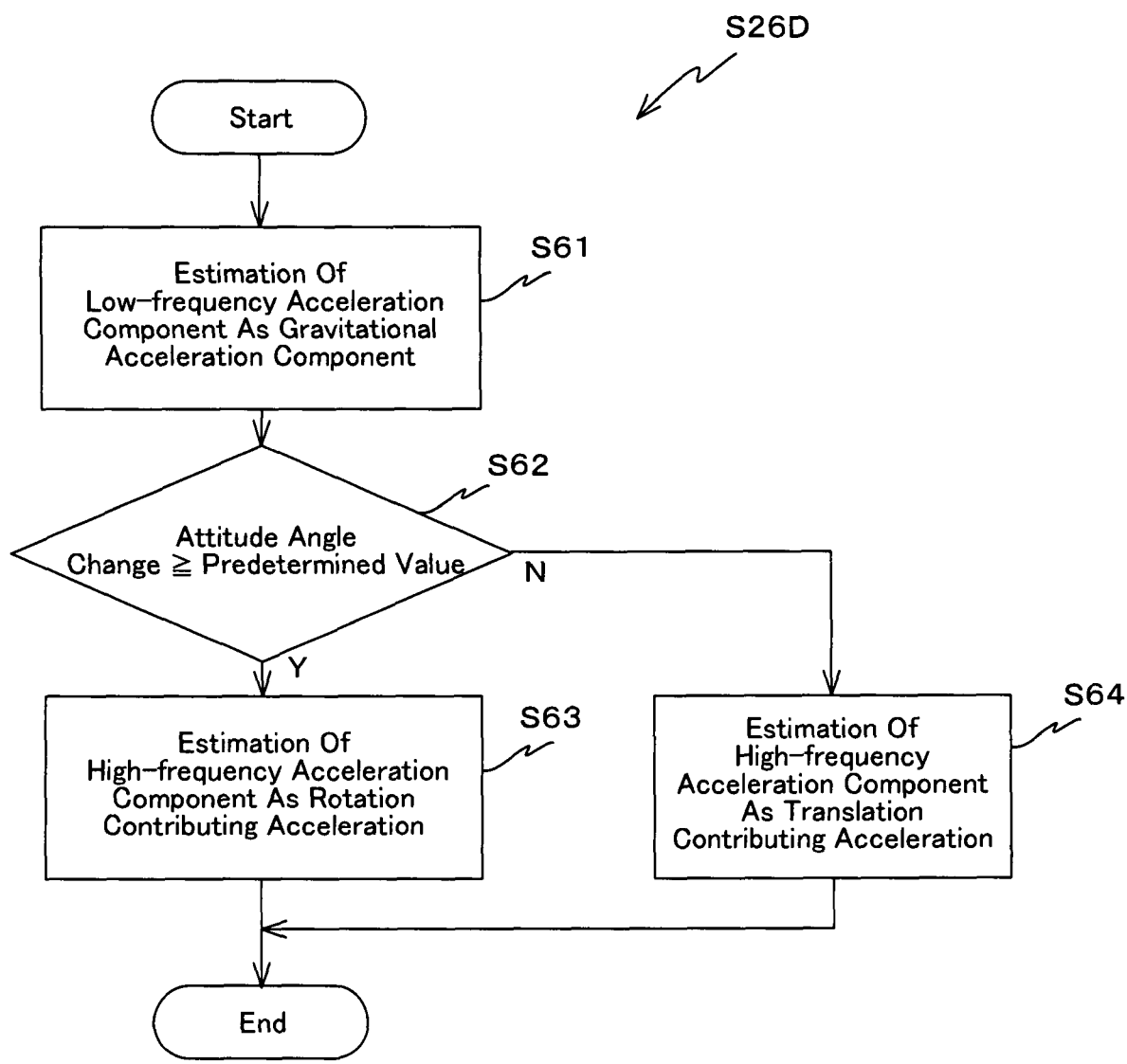
FIG. 16 is a flowchart for describing a process at a step of estimating the translation contributing acceleration and rotation contributing acceleration in FIG. 15.

Further, at step S26D, the translation rotation acceleration estimating section 45D estimates the translation contributing acceleration and the rotation contributing acceleration based on the high-frequency component and the low-frequency component from the acceleration frequency separating section 42D, and the attitude angle and the time rate of change of the attitude angle from the attitude angle change rate deriving section 43D. At the time of estimating, as shown in FIG. 16, at step S61, the low-frequency component estimating section 52D of the translation rotation acceleration estimating section 45A, estimates that the entire low-frequency acceleration component is a gravitational acceleration component, and does not include the translation contributing acceleration or the rotation contributing acceleration.

Next, at step S62, the high-frequency component estimating section 51D of the translation rotation acceleration estimating section 45A makes a judgment of whether or not at least one of the time rate of change of the attitude angle received from the attitude angle change rate deriving section 43 is not less than a predetermined value. When the judgment result is affirmative, the process is moved to step S63. At step S63, the high-frequency component estimating section 51D estimates that the entire high-frequency acceleration component is the rotation contributing acceleration.

On the other hand, when the judgment result at step S62 is negative, the process is moved to step S64. At step S64, the high-frequency component estimating section 51D estimates that the entire high-frequency acceleration component is the translation contributing acceleration.

When the translation contributing acceleration and the rotation contributing acceleration are estimated, the translation rotation acceleration estimating section 45D stores in the temporary storage area 24, the estimated translation contributing acceleration, the rotation contributing acceleration, and the attitude angle, as a set of data for notification. Thus, when step S26D is completed, as shown in FIG. 15, the process is moved to step S21. In this embodiment onward, the measured data processing computer program 35D repeats steps from step S21 to step S26D until the request for stopping the measured data processing is received from the application 33.

At a desired point of time in the measured data processing at step S11D, when the application 33 issues a data request in which an application identifier is let to be a parameter, similarly as in the case of the first embodiment, in the measured data processing computer program 35D, the measured data processing control section 49 receives this data request, then analyzes a command from the application 33, and identifies it to be a data request from the application 33. Further, the measured data processing control section 49 gives a notification command of data for notification to the application 33, to the data notifying section 46. The data notifying section 46 which has received the command performs the data notification process at step S12$_j$ (j=1, 2 . . . ).

Thus, by the processing of the measured data, the application 33 can acquire the estimate values of the latest translation contributing acceleration, the rotation contributing acceleration, and the attitude angle at a point of time corresponding to these estimate values, by issuing the data request at the desired point of time.

Moreover, even in the fourth embodiment, similarly as in the case of the first embodiment, the measured data processing at step S11D is completed by issuing the data collection stop request at a desired time by the application 33. Furthermore, when the application 33 issues the sensor operation stop request, the measured data processing computer program 35D (more particularly, the measured data processing control section 49) which has received the sensor operation stop request, sends the sensor operation stop command to the sensor unit 25. As a result of this, the operation of the sensor unit 25 is stopped.

As described above, in the fourth embodiment, the data collecting section 41 collects the measurement result of the attitude angle and the measurement result of the acceleration in the direction along each of the X-axis and the Y-axis from among the X-axis, the Y-axis, and the Z-axis which are mutually orthogonal, and are peculiarly defined in the cellular phone 10. Next, the acceleration frequency separating section 42D separates the low-frequency acceleration component which can be evaluated as the direct current component in each of the measurement results of acceleration, and the high-frequency acceleration component other than the low-frequency acceleration component. Moreover, the attitude angle change rate deriving section 43 derives the low-frequency component of the time rate of change of the attitude angle. Furthermore, the translation rotation acceleration estimating section 45D estimates the translation contributing acceleration and the rotation contributing acceleration based on the high-frequency acceleration component, the low-frequency acceleration component, and the low-frequency component of the time rate of change of the attitude angle, and the attitude angle.

In this embodiment, the low-frequency component estimating section 52D in the translation rotation acceleration estimating section 45D estimates that the low-frequency component includes only the gravitational acceleration component. Moreover, the high-frequency component estimating section 51D in the translation rotation acceleration estimating section 45D makes a judgment of whether or not the absolute value of the time rate of change of the attitude angle is not less than a predetermined value. When the judgment is negative, the high-frequency component estimating section 51D estimates that the component of the rotation contributing acceleration is not included in the high-frequency acceleration component, and only the component of the translation contributing acceleration is included in the high-frequency acceleration component. On the other hand, when the judgment is affirmative, the high-frequency component estimating section 51D estimates that the component of the translation contributing acceleration is not included in the high-frequency acceleration component, and only the component of the rotation contributing acceleration is included in the high-frequency acceleration component.

Consequently, it is possible to estimate with improved accuracy the translation contributing acceleration which contributes to the translational movement and the rotation contributing acceleration which contributes to the rotational movement of the cellular phone 10.

<Fifth Embodiment>

A fifth embodiment of the present invention will be described below. In the description of the fifth embodiment, for components which are same as or similar to the components in the fourth embodiment, the same reference numerals are used, and repeated description is omitted.

A cellular phone 10 of the fifth embodiment differs from the cellular phone 10 of the fourth embodiment at a point that the cellular phone 10 of the fifth embodiment includes a measured data processing computer program 35E instead of the measured data processing computer program 35D. The cellular phone 10 in the fifth embodiment will be described below by focusing mainly at the point of difference.

Figure 17:
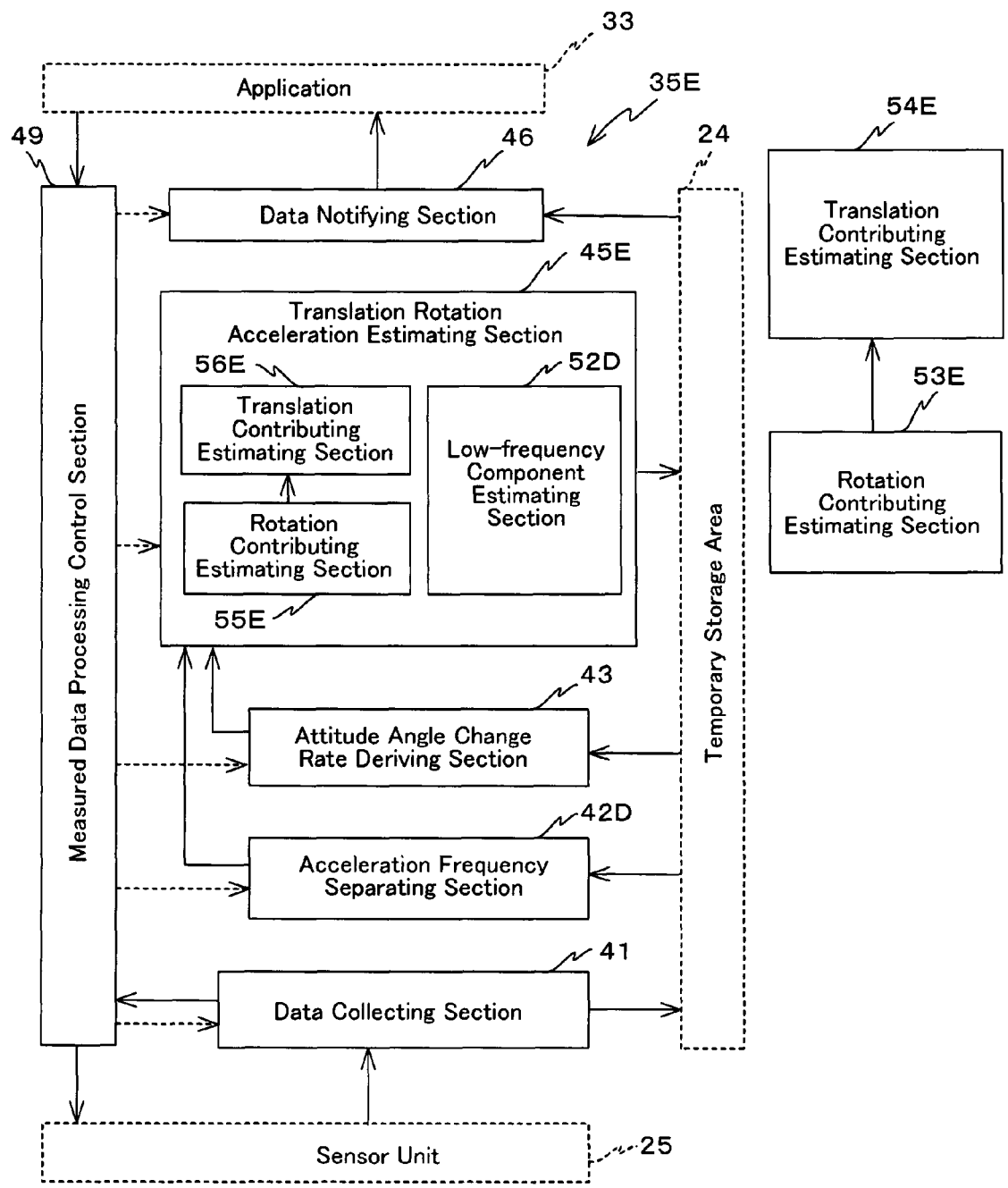
FIG. 17 is a functional block diagram for describing a configuration of a measured data processing computer program in a fifth embodiment.

The measured data processing computer program 35E, as shown in FIG. 17, differs from the measured data processing computer program 35D in the fourth embodiment only at a point that the measured data processing computer program 35E includes a translation rotation acceleration estimating section 45E instead of the translation rotation acceleration estimating section 45D. This translation rotation acceleration estimating section 45E differs from the translation rotation acceleration estimating section 45D only at a point that the translation rotation acceleration estimating section 45E includes instead of the high-frequency component estimating section 51D, a rotation contributing component estimating section 55E which estimates the rotation contributing acceleration component, and a translation contributing component estimating section 56E which estimates the translation contributing acceleration component based on the high-frequency acceleration component and the rotation contributing acceleration component.

Figure 18:
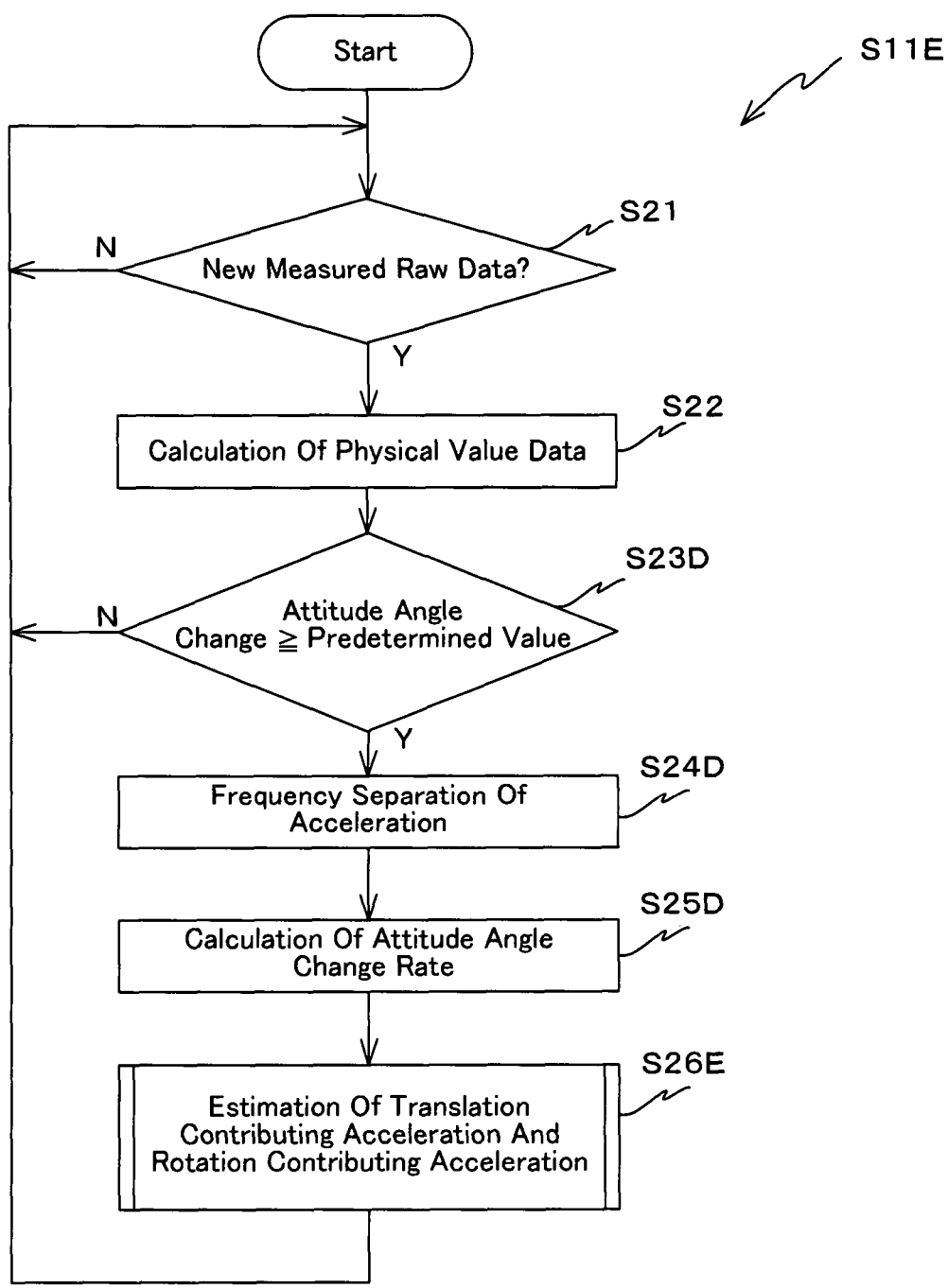
FIG. 18 is a flowchart for describing a process at a measured data processing step in the fifth embodiment.

The cellular phone 10 of the fifth embodiment which is structured in such manner, differs at a point that instead of the measured data processing at step S11D in the fourth embodiment, a measured data processing at step S11E (refer to FIG. 18) is performed. At this step S11E, as shown in FIG. 18, first of all, similarly as in the forth embodiment, at steps from step S21 to step S24D, the data collecting section 41 collects the measured raw data, then calculates the measured physical value data, and stores in the temporary storage area 24. Accordingly, when more than a predetermined number of sets of the measured physical value data are collected, the acceleration frequency separating section 42D separates the high-frequency acceleration component and the low-frequency acceleration component (component which can be evaluated as the direct current component), based on the acceleration data in the measured physical value data. Further, at step S25D, the attitude angle change rate deriving section 43 which has received the command from the measured data processing control section 49, based on the attitude angle data in the measured physical value data, derives the time rate of change of each of the attitude angles at a point of time at which the low-frequency acceleration component was calculated.

Figure 19:
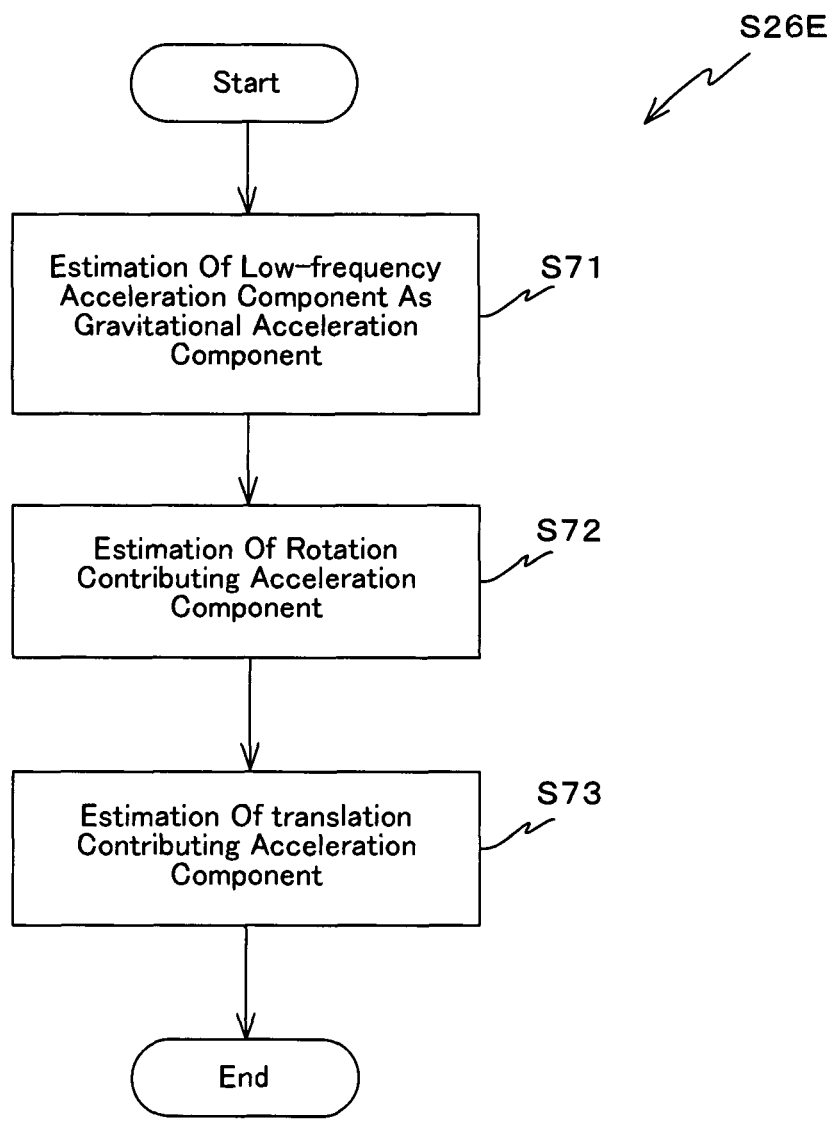
FIG. 19 is a flowchart for describing a process at a step of estimating the translation contributing acceleration and the rotation contributing acceleration in FIG. 18.

Next, at step S26E, the translation rotation acceleration estimating section 45E estimates the translation contributing acceleration and the rotation contributing acceleration based on the high-frequency component and the low-frequency component from the acceleration frequency separating section 42D, and the attitude angle and the low-frequency component of the time rate of change of the attitude angle from the attitude angle change rate derived section 43. At the time of estimating, as shown in FIG. 19, at step S71, the low-frequency component estimating section 52D of the translation rotation acceleration estimating section 45E, similarly as in the case of the fourth embodiment, estimates that the entire low-frequency acceleration component is the gravitational acceleration component, and does not include the translation contributing acceleration component or the rotation contributing acceleration component.

Next, at step S72, the rotation contributing acceleration estimating section 55E of the translation rotation acceleration estimating section 45E estimates the rotation contributing acceleration component which is the acceleration component contributing to the rotational movement, based on the rate of change of the attitude angle which is received from the attitude angle change rate deriving section 43, and barycentric position and moment of inertia of the cellular phone 10, which are known in advance. Next, the translation contributing acceleration estimating section 56E of the translation rotation acceleration estimating section 45E, at step S73, subtracts the rotation contributing low-frequency acceleration component received from the rotation contributing acceleration estimating section 55E. The translation contributing acceleration estimating section 56E estimates that the resultant calculated in such manner is the translation contributing low-frequency acceleration component which is the acceleration component contributing to the translational movement.

Thus, when the translation contributing acceleration and the rotation contributing acceleration are estimated, the translation rotation acceleration estimating section 45E stores in the temporary storage area 24, the estimated translation contributing acceleration, the rotation contributing acceleration, and the attitude angle as a set of the data for notification. When the step S26E is completed, as shown in FIG. 18, the process is moved to step S21. In this embodiment onward, the measured data processing computer program 35E repeats steps from step S21 to step S26E until the request for stopping the measured data processing is received from the application 33.

At a desired point of time in the measured data processing at step S11E, when the application 33 issues a data request in which an application identifier is let to be a parameter, similarly as in the case of the first embodiment, in the measured data processing computer program 35E, the measured data processing control section 49 receives this data request, then analyzes a command from the application 33, and identifies it to be a data request from the application 33. Further, the measured data processing control section 49 gives a notification command of data for notification to the application 33, to the data notifying section 46. The data notifying section 46 which has received this command performs the data notification process at step S12$_j$ (j=1, 2 . . . ).

Thus, by the processing of the measured data, the application 33 can acquire the estimate value of the latest translation contributing acceleration, the rotation contributing acceleration, and the attitude angle at a point of time corresponding to these estimate values, by issuing the data request at the desired point of time.

Moreover, even in the fifth embodiment, similarly as in the case of the first embodiment, the measured data processing at step S11E is completed by issuing the data collection stop request at a desired time by the application 33. Furthermore, when the application 33 issues the sensor operation stop request, the measured data processing computer program 35E (more particularly, the measured data processing control section 49) which has received the sensor operation stop request, sends the sensor operation stop command to the sensor unit 25. As a result of this, the operation of the sensor unit 25 is stopped.

As described above, in the fifth embodiment, the data collecting section 41 collects the measurement result of the attitude angle and the measurement result of the acceleration in the direction along each of the X-axis and the Y-axis from among the X-axis, the Y-axis, and the Z-axis which are mutually orthogonal, which are defined peculiarly in the cellular phone 10. Next, the acceleration frequency separating section 42D separates the low-frequency acceleration component which can be evaluated as the direct current component in each of the measurement result of acceleration, and the high-frequency acceleration component. Moreover, the attitude angle change rate deriving section 43 derives the time rate of change of the attitude angle. Furthermore, the translation rotation acceleration estimating section 45E estimates the translation contributing acceleration and the rotation contributing acceleration based on the high-frequency acceleration component, the low-frequency acceleration component, and the low-frequency component of the time rate of change of the attitude angle, and the attitude angle.

In this embodiment, the low-frequency component estimating section 52D in the translation rotation acceleration estimating section 45E estimates that the low-frequency acceleration component includes only the gravitational acceleration component. Moreover, the rotation contributing component estimating section 55E in the translation rotation acceleration estimating section 45E estimates the rotation contributing acceleration component, and the translation contributing component estimating section 56E in the translation rotation acceleration estimating section 45E estimates the translation contributing acceleration component.

Consequently, it is possible to estimate with improved accuracy the translation contributing acceleration which contributes to the translational movement and the rotation contributing acceleration which contributes to the rotational movement of the cellular phone 10.

Note that in each of the embodiments from the first embodiment to the fifth embodiment, the sensor unit 25 is installed inside the cellular phone 10. However, the sensor unit 25 may be disposed outside the cellular phone 10, and the sensor unit 25 and the cellular phone 10 may be connected via an interface port for connecting an external equipment which is not shown in the diagram, of the cellular phone 10.

Moreover, in each of the embodiments from the first embodiment to the fifth embodiment, the sensor section 26 of the sensor unit 25 is let to be a five-axis sensor which detects the pitch angle $\theta_X$, the roll angle $\theta_Y$, the yaw angle $\theta_Z$, the acceleration $\alpha_X$ in the X direction, and the acceleration $\alpha_Y$ in the Y direction. However, the sensor section 26 can also be let to be a six-axis sensor which detects further acceleration $\alpha_Z$ in the Z-direction. Furthermore, the sensor section 26 can also be let to be a sensor which detects a physical value other than the attitude angle and the acceleration.

In each of the embodiments from the first embodiment to the fifth embodiment, the line-wise direction and the column-wise direction in the key arrangement in the matrix form of the operating section 12 are let to be the X axis and the Y axis respectively, where in XY plane is parallel to horizontal plane and the attitude in which the +Y direction is the due south direction is let to be the reference attitude. However, other attitude can also be let to be the reference attitude. In such case, it is necessary to measure in advance a relation between the reference attitude and a vertical direction, to find a relation between the vertical direction and the attitude at a point of time at which each of the measured data is acquired.

Moreover, in each of the embodiments from the first embodiment to the fifth embodiment, a so-called straight cellular phone in which a positional relationship between the operating section 12 in which the keys are arranged, and the display section 13 is fixed, is let to be the cellular phone. However, in a case of a cellular phone such as a so-called clamshell type and revolver type, in which the positional relationship of the operating section and the display section is variable, the sensor unit 25 may be disposed on an operating section side or may be disposed on a display section side. Moreover, an axial direction which is a reference for measurement in the sensor unit 25 can also be decided according to a position of disposing of the sensor unit 25, and a type of the cellular phone.

Furthermore, in each of the embodiments from the first embodiment to the fifth embodiment, the present invention is applied to the cellular phone. However, it is needless to mention that the present invention can also be applied to other types of mobile terminals such as a mobile game machine, a car navigation equipment, and a PDA (Personal Digital Assistance).

As described above, the method for acceleration estimation, and the acceleration estimation apparatus of the present invention can be used in a case of estimating the translation contributing acceleration which contributes to the translational movement of the moving object, and the rotation contributing acceleration which contributes to the rotational movement of the moving object. Moreover, the mobile terminal of the present invention can be used as a mobile terminal which estimates the translation contributing acceleration which contributes to the translational movement of the mobile terminal, and the rotation contributing acceleration which contributes to the rotational movement of the mobile terminal, and uses the estimation result.

What is claimed is:

1. A method for acceleration estimation of estimating a translation contributing acceleration which contributes to a translational movement of a moving object in a measurement result of acceleration along at least two axial directions from among a first axis, a second axis which is orthogonal to the first axis, and a third axis which is orthogonal to the first axis and the second axis, which are defined for the moving object, and a rotation contributing acceleration which contributes to a rotational movement, comprising steps of:

collecting a measurement result of acceleration along the two axes, and a measurement result of an attitude angle which is an angle of rotation from a reference attitude of the moving object;

separating an acceleration frequency in a low-frequency acceleration component and a high-frequency acceleration component in the measurement result of the acceleration along the two axes, wherein the separating is performed by reading a predetermined number of recent data, finding the low-frequency acceleration component by calculating a moving average deviation, and finding the high-frequency acceleration component by subtracting the low-frequency acceleration component from acceleration data at a point of time at which it is estimated to include the calculated low-frequency acceleration component, wherein when attitude angle data at the point of time does not exist, an attitude angle change rate deriving means calculates an average value of attitude angle data before and after the point of time, and sets the average value to be the attitude angle at the point of time;

deriving a rate of change of attitude angle at which a time rate of change of the attitude angle is derived, wherein the time rate of change of the attitude angle is derived at the point of time at which it is estimated to include a calculated low-frequency acceleration component by calculating a difference between attitude angle before and after a point of time at which it is estimated to include the calculated low-frequency acceleration component; and estimating the translation contributing acceleration and the rotation contributing acceleration based on the high-frequency acceleration component, the low-frequency acceleration component, the attitude angle, and the time rate of change of the attitude angle.

2. The method for acceleration estimation according to claim 1, wherein the step of estimating the translation contributing acceleration and the rotation contributing acceleration comprises steps of:

estimating a high-frequency component, at which it is estimated that the high-frequency acceleration component does not include a component of the rotation contributing acceleration, and includes only a component of the translation contributing acceleration;

estimating a low-frequency component, at which, when an absolute value of the time rate of change of the attitude angle is less than a predetermined value, it is estimated that a resultant obtained upon subtracting a gravitational acceleration from the low-frequency acceleration component does not include the component of the rotation contributing acceleration, and includes only the component of the translation contributing acceleration, and when the absolute value of the time rate of change of the attitude angle is not less than the predetermined value, it is estimated that the resultant obtained upon subtracting the gravitational acceleration from the low-frequency acceleration component, does not include the component of the translation contributing acceleration, and includes only the component of the rotation contributing acceleration.

3. The method for acceleration estimation according to claim 1, wherein at the step of deriving the rate of change of the attitude angle, a low-frequency component of the time rate of change of the attitude angle is derived, and the step of estimating the translation contributing acceleration and the rotation contributing acceleration comprises steps of:

estimating a high-frequency component at which it is estimated that the high-frequency acceleration component does not include the component of the rotation contributing acceleration, and includes only the component of the translation contributing acceleration;

estimating a rotation contributing low-frequency component at which a rotation contributing low-frequency acceleration component which is a component of the rotation contributing acceleration in the low-frequency acceleration component is estimated based on the low-frequency component of the time rate of change of the attitude angle; and estimating a translation contributing low-frequency component at which it is estimated that a resultant obtained upon subtracting the rotation contributing low-frequency acceleration component and a gravitational acceleration from the low-frequency acceleration component is a translation contributing low-frequency acceleration component which is a low-frequency component of the translation contributing acceleration.

4. The method for acceleration estimation according to claim 1, wherein at the step of deriving the rate of change of attitude angle, a low-frequency component in the time rate of change of the attitude angle and a high-frequency component in the time rate of change of the attitude angle are separated, and the step of estimating the translation acceleration comprises steps of:

estimating a rotation contributing high-frequency component at which a rotation contributing high-frequency acceleration component which is a high-frequency component of the rotation contributing acceleration in the high-frequency acceleration component is estimated, based on a high-frequency component of the time rate of change of the attitude angle;

estimating a translation contributing high-frequency component at which it is estimated that a resultant obtained upon subtracting the rotation contributing high-frequency acceleration component from the high-frequency acceleration component is a translation contributing high-frequency acceleration component which is a high-frequency component of the translation contributing acceleration;

estimating rotation contributing low-frequency component at which a rotation contributing low-frequency acceleration component which is a low-frequency component of the rotation contributing acceleration in the low-frequency acceleration component is estimated based on a low-frequency component of the time rate of change of the attitude angle; and estimating a translation contributing low-frequency component at which it is estimated that a resultant obtained upon subtracting the rotation contributing low-frequency acceleration component and a gravitational acceleration from the low-frequency acceleration component is a translation contributing low-frequency acceleration component which is a low-frequency component of the translation contributing acceleration.

5. The method for acceleration estimation according to claim 1, wherein at the step of separating the acceleration frequency, a component which can be evaluated as a direct current component is extracted as the low-frequency acceleration component, and the step of estimating the translation contributing acceleration and the rotation contributing acceleration comprises steps of:

estimating a low-frequency component, at which the low-frequency acceleration component is derived only from a gravitational acceleration; and estimating a high-frequency component, at which, when an absolute value of the time rate of change of the attitude angle is less than a predetermined value, it is estimated that the high-frequency acceleration component does not include a component of a rotation contributing acceleration which contributes to the rotational movement, and includes only a component of the translation contributing acceleration, and when the absolute value of the time rate of change of the attitude angle is not less than the predetermined value, it is estimated that the high-frequency component does not include the component of the translation contributing acceleration, and includes only the component of the rotation contributing acceleration.

6. The method for acceleration estimation according to claim 1, wherein at the step of separating the acceleration frequency, a component which can be evaluated as a direct current component is extracted as the low-frequency acceleration component, and the step of estimating the translation acceleration and the rotation acceleration comprises steps of:

estimating a low-frequency component, at which it is estimated that the low-frequency acceleration component is derived only from a gravitational acceleration;

estimating a rotation contributing acceleration component, at which a rotation contributing acceleration component which contributes to rotational movement in the high-frequency acceleration component is estimated based on the time rate of change of the attitude angle; and estimating a translation contributing component, at which it is estimated that a resultant obtained upon subtracting the rotation contributing acceleration component from the high-frequency acceleration component is the translation contributing acceleration component.

7. An acceleration estimating apparatus which estimates a translation contributing acceleration which contributes to a translational movement of a moving object in a measurement result of acceleration along at least two axial directions from among a first axis, a second axis which is orthogonal to the first axis, and a third axis which is orthogonal to the first axis and the second axis, which are defined for the moving object, and a rotation contributing acceleration which contributes to a rotational movement of the moving object, comprising:

a measurement result collecting means which collects a measurement result of acceleration along at least the two axes, and a measurement result of an attitude angle which is an angle of rotation from a reference attitude of the moving object;

an acceleration frequency separating means which separates an acceleration frequency in a low-frequency acceleration component and a high-frequency acceleration component in the measurement result of the acceleration along at least the two axes, wherein the acceleration frequency separating means reads a predetermined number of recent data, finds a low-frequency acceleration component by calculating a moving average deviation, and finds the high-frequency acceleration component by subtracting the low-frequency acceleration component from acceleration data at a point of time at which it is estimated to include the calculated low-frequency acceleration component;

an attitude angle change rate deriving means which derives a time rate of change of the attitude angle, wherein the time rate of change of the attitude angle is derived at the point of time at which it is estimated to include a calculated low-frequency acceleration component by calculating a difference between attitude angle before and after a point of time at which it is estimated to include the calculated low-frequency acceleration component, wherein when attitude angle data at the point of time does not exist, the attitude angle change rate deriving means calculates an average value of attitude angle data before and after the point of time, and sets the average value to be the attitude angle at the point of time; and a translation rotation acceleration estimating means which estimates the translation contributing acceleration and the rotation contributing acceleration based on the high-frequency acceleration component, the low-frequency acceleration component, the attitude angle, and the time rate of change of the attitude angle.

8. The acceleration estimating apparatus according to claim 7, wherein the translation rotation acceleration estimating means comprises:

a high-frequency component estimating means which estimates that the high-frequency acceleration component does not include a component of the rotation contributing acceleration which contributes to the rotation, and includes only a component of the translation contributing acceleration; and a low-frequency component estimating means which, when an absolute value of the time rate of change of the attitude angle is less than a predetermined value, estimates that a resultant obtained upon subtracting a gravitational acceleration from the low-frequency acceleration component does not include the component of the rotation contributing acceleration, and includes only the component of the translation contributing acceleration, and when the absolute value of the time rate of change of the attitude angle is not less than the predetermined value, estimates that the resultant obtained upon subtracting the gravitational acceleration from the low-frequency acceleration component, does not include the component of the translation contributing acceleration, and includes only the component of the rotation contributing acceleration.

9. The acceleration estimating apparatus according to claim 7, wherein the attitude angle change rate deriving means derives a low-frequency component of the time rate of change of the attitude angle, and the translation rotation acceleration estimating means comprises:

a high-frequency component estimating means which estimates that the high-frequency acceleration component does not include the component of the rotation contributing acceleration; includes only the component of the translation contributing acceleration;

a rotation contributing low-frequency component estimating means which estimates a rotation contributing low-frequency acceleration component which is a component of the rotation contributing acceleration in the low-frequency acceleration component, based on the low-frequency component of the time rate of change of the attitude angle; and a translation contributing low-frequency component estimating means which estimates that a resultant obtained upon subtracting the rotation contributing low-frequency acceleration component and a gravitational acceleration from the low-frequency acceleration component is a translation contributing low-frequency acceleration component which is a low-frequency component of the translation contributing acceleration.

10. The acceleration estimating apparatus according to claim 7, wherein the attitude angle change rate deriving means separates a low-frequency component and a high-frequency component in the time rate of change of the attitude angle, and the translation rotation acceleration estimating means comprises:

a rotation contributing high-frequency component estimating means, which estimates a rotation contributing high-frequency acceleration component which is a high-frequency component of the rotation contributing acceleration in the high-frequency acceleration component, based on a high-frequency component of the time rate of change of the attitude angle;

a translation contributing high-frequency component estimating means, which estimates that a resultant obtained upon subtracting the rotation contributing high-frequency acceleration component from the high-frequency acceleration component is a translation contributing high-frequency component which is a high-frequency component of the translation contributing acceleration;

a rotation contributing low-frequency component estimating means which estimates a rotation contributing low-frequency acceleration component which is a low frequency component of the rotation contributing acceleration in the low-frequency acceleration component, based on a low-frequency component of the time rate of change of the attitude angle; and a translation contributing low-frequency component estimating means which estimates that a resultant obtained upon subtracting the rotation contributing low-frequency acceleration component and a gravitation acceleration from the low-frequency acceleration component is a translation contributing low-frequency acceleration component which is a low-frequency component of the translation contributing acceleration.

11. The acceleration estimating apparatus according to claim 7, wherein
the acceleration frequency separating means extracts a component which can be evaluated as a direct current component, as the low-frequency acceleration component, and
the translation rotation acceleration estimating means comprises:
a low-frequency component estimating means which estimates that the low-frequency acceleration component is derived only from a gravitational acceleration; and
a high-frequency component estimating means which, when an absolute value of the time rate of change of the attitude angle is less than a predetermined value, estimates that the high-frequency acceleration component does not include a component of a rotation contributing acceleration which contributes to a rotational movement, and includes only a component of the translation contributing acceleration, and when the absolute value of the time rate of change of the attitude angle is not less than the predetermined value, estimates that the high-frequency component does not include the component of the translation contributing acceleration, and includes only the component of the rotation contributing acceleration.

12. The acceleration estimating apparatus according to claim 7, wherein
the acceleration frequency separating means extracts a component which can be evaluated as a direct current component, as the low-frequency acceleration component, and
the translation rotation acceleration estimating means comprises:
a low-frequency component estimating means which estimates that the low-frequency acceleration component is derived only from a gravitational acceleration;
a rotation contributing component estimating means which estimates a rotation contributing acceleration component which contributes to a rotational movement in the high-frequency acceleration component, based on the time rate of change of the attitude angle; and
a translation contributing component estimating means which estimates that a resultant obtained upon subtracting the rotation contributing acceleration component from the high-frequency acceleration component is the translation contributing acceleration component.

13. A mobile terminal, which can be operated while moving, comprising:
the acceleration estimating apparatus according to claim 7.

14. The mobile terminal according to claim 13, wherein the translational movement and rotational movement correspond to a character.

15. A method for acceleration estimation of estimating a translation contributing acceleration which contributes to a translational movement of a moving object in a measurement result of acceleration along at least two axial directions from among a first axis, a second axis which is orthogonal to the first axis, and a third axis which is orthogonal to the first axis and the second axis, which are defined for the moving object, and a rotation contributing acceleration which contributes to a rotational movement, wherein the translational movement and rotational movement correspond to a character, comprising steps of:
collecting a measurement result of acceleration along the two axes, and a measurement result of an attitude angle which is an angle of rotation from a reference attitude of the moving object;
separating an acceleration frequency in a low-frequency acceleration component and a high-frequency acceleration component in the measurement result of the acceleration along the two axes, wherein the separating is performed by reading a predetermined number of recent data, finding the low-frequency acceleration component by calculating a moving average deviation, and finding the high-frequency acceleration component by subtracting the low-frequency acceleration component from acceleration data at a point of time at which it is estimated to include the calculated low-frequency acceleration component;
deriving a rate of change of attitude angle at which a time rate of change of the attitude angle is derived, wherein the time rate of change of the attitude angle is derived at the point of time at which it is estimated to include a calculated low-frequency acceleration component by calculating a difference between attitude angle before and after a point of time at which it is estimated to include the calculated low-frequency acceleration component, wherein when attitude angle data at the point of time does not exist, an attitude angle change rate deriving means calculates an average value of attitude angle data before and after the point of time, and sets the average value to be the attitude angle at the point of time; and
estimating the translation contributing acceleration and the rotation contributing acceleration based on the high-frequency acceleration component, the low-frequency acceleration component, the attitude angle, the time rate of change of the attitude angle, and a predetermined value.

16. The method for acceleration estimation according to claim 15, wherein
the step of estimating the translation contributing acceleration and the rotation contributing acceleration comprises steps of:
estimating a high-frequency component, at which it is estimated that the high-frequency acceleration component does not include a component of the rotation contributing acceleration, and includes only a component of the translation contributing acceleration;

estimating a low-frequency component, at which, when an absolute value of the time rate of change of the attitude angle is less than the predetermined value, it is estimated that a resultant obtained upon subtracting a gravitational acceleration from the low-frequency acceleration component does not include the component of the rotation contributing acceleration, and includes only the component of the translation contributing acceleration, and when the absolute value of the time rate of change of the attitude angle is not less than the predetermined value, it is estimated that the resultant obtained upon subtracting the gravitational acceleration from the low-frequency acceleration component, does not include the component of the translation contributing acceleration, and includes only the component of the rotation contributing acceleration.

17. The method for acceleration estimation according to claim 15, wherein at the step of separating the acceleration frequency, a component which can be evaluated as a direct current component is extracted as the low-frequency acceleration component, and the step of estimating the translation contributing acceleration and the rotation contributing acceleration comprises steps of:

estimating a low-frequency component, at which the low-frequency acceleration component is derived only from a gravitational acceleration; and estimating a high-frequency component, at which, when an absolute value of the time rate of change of the attitude angle is less than the predetermined value, it is estimated that the high-frequency acceleration component does not include a component of a rotation contributing acceleration which contributes to the rotational movement, and includes only a component of the translation contributing acceleration, and when the absolute value of the time rate of change of the attitude angle is not less than the predetermined value, it is estimated that the high-frequency component does not include the component of the translation contributing acceleration, and includes only the component of the rotation contributing acceleration.

18. An acceleration estimating apparatus which estimates a translation contributing acceleration which contributes to a translational movement of a moving object in a measurement result of acceleration along at least two axial directions from among a first axis, a second axis which is orthogonal to the first axis, and a third axis which is orthogonal to the first axis and the second axis, which are defined for the moving object, and a rotation contributing acceleration which contributes to a rotational movement of the moving object, comprising:

a measurement result collecting means which collects a measurement result of acceleration along at least the two axes, and a measurement result of an attitude angle which is an angle of rotation from a reference attitude of the moving object;

an acceleration frequency separating means which separates an acceleration frequency in a low-frequency acceleration component and a high-frequency acceleration component in the measurement result of the acceleration along at least the two axes, wherein the acceleration frequency separating means reads a predetermined number of recent data, finds a low-frequency acceleration component by calculating a moving average deviation, and finds the high-frequency acceleration component by subtracting the low-frequency acceleration component from acceleration data at a point of time at which it is estimated to include the calculated low-frequency acceleration component;

an attitude angle change rate deriving means which derives a time rate of change of the attitude angle, wherein the time rate of change of the attitude angle is derived at the point of time at which it is estimated to include a calculated low-frequency acceleration component by calculating a difference between attitude angle before and after a point of time at which it is estimated to include the calculated low-frequency acceleration component, wherein when attitude angle data at the point of time does not exist, the attitude angle change rate deriving means calculates an average value of attitude angle data before and after the point of time, and sets the average value to be the attitude angle at the point of time; and a translation rotation acceleration estimating means which estimates the translation contributing acceleration and the rotation contributing acceleration based on the high-frequency acceleration component, the low-frequency acceleration component, the attitude angle, the time rate of change of the attitude angle, and a predetermined value.

19. The acceleration estimating apparatus according to claim 18, wherein the translation rotation acceleration estimating means comprises:

a high-frequency component estimating means which estimates that the high-frequency acceleration component does not include a component of the rotation contributing acceleration which contributes to the rotation, and includes only a component of the translation contributing acceleration; and a low-frequency component estimating means which, when an absolute value of the time rate of change of the attitude angle is less than the predetermined value, estimates that a resultant obtained upon subtracting a gravitational acceleration from the low-frequency acceleration component does not include the component of the rotation contributing acceleration, and includes only the component of the translation contributing acceleration, and when the absolute value of the time rate of change of the attitude angle is not less than the predetermined value, estimates that the resultant obtained upon subtracting the gravitational acceleration from the low-frequency acceleration component, does not include the component of the translation contributing acceleration, and includes only the component of the rotation contributing acceleration.

20. The acceleration estimating apparatus according to claim 18, wherein the acceleration frequency separating means extracts a component which can be evaluated as a direct current component, as the low-frequency acceleration component, and the translation rotation acceleration estimating means comprises:

a low-frequency component estimating means which estimates that the low-frequency acceleration component is derived only from a gravitational acceleration; and a high-frequency component estimating means which, when an absolute value of the time rate of change of the attitude angle is less than the predetermined value, estimates that the high-frequency acceleration component does not include a component of a rotation contributing acceleration which contributes to a rotational movement, and includes only a component of the translation contributing acceleration, and when the absolute value of the time rate of change of the attitude angle is not less than the predetermined value, estimates that the high-frequency component does not include the component of the translation contributing acceleration, and includes only the component of the rotation contributing acceleration.

* * * * *